(12) United States Patent
Mukherjee et al.

(10) Patent No.: US 11,570,662 B2
(45) Date of Patent: Jan. 31, 2023

(54) METHODS AND APPARATUS FOR MULTI-RADIO ACCESS TECHNOLOGY ACCESS AND BACKHAUL

(71) Applicant: Charter Communications Operating, LLC, St. Louis, MO (US)

(72) Inventors: Amitav Mukherjee, Elk Grove, CA (US); Ahmad Reza Hedayat, Carlsbad, CA (US)

(73) Assignee: Charter Communications Operating, LLC, St. Louis, MO (US)

(*) Notice: Subject to any disclaimer, the term of this patent is extended or adjusted under 35 U.S.C. 154(b) by 212 days.

(21) Appl. No.: 17/139,847

(22) Filed: Dec. 31, 2020

(65) Prior Publication Data
US 2022/0210699 A1 Jun. 30, 2022

(51) Int. Cl.
*H04W 28/08* (2009.01)
*H04W 76/11* (2018.01)
(Continued)

(52) U.S. Cl.
CPC ....... *H04W 28/0819* (2020.05); *H04W 40/20* (2013.01); *H04W 76/11* (2018.02); *H04W 88/10* (2013.01)

(58) Field of Classification Search
None
See application file for complete search history.

(56) References Cited

U.S. PATENT DOCUMENTS

| | | | |
|---|---|---|---|
| 10,827,423 B1 * | 11/2020 | Manganiello | H04W 48/20 |
| 2021/0037531 A1 * | 2/2021 | Abedini | H04W 72/046 |

(Continued)

FOREIGN PATENT DOCUMENTS

| | | | |
|---|---|---|---|
| EP | 2907341 | * | 7/2020 |
| WO | WO2021019332 | * | 7/2020 |

(Continued)

OTHER PUBLICATIONS

3rd Generation Partnership Project; Technical Specification Group Radio Access Network; NR; Study on Integrated Access and Backhaul (Release 16), 3GPP TR 38.874 V16.0.0, Dec. 2018, 111 pages.
New WID on Enhancements to Integrated Access and Backhaul, RP-193251, Qualcomm, 3GPP TSG RAN Meeting #86, Sitges, Spain, Dec. 9-12, 2019, 5 pages.
Technical Specification 5G; NR; Backhaul Adaptation Protocol (BAP) specification, 3GPP TS 38.340 version 16.1.0 (Release 16), Jul. 2020, 24 pages.

(Continued)

*Primary Examiner* — Mohammad S Adhami
(74) *Attorney, Agent, or Firm* — Straub & Straub; Stephen T. Straub; Michael P. Straub

(57) ABSTRACT

The present invention relates to methods and apparatus for providing backhaul wireless services using a plurality of different Radio Access Technologies. An exemplary method embodiment includes the steps of: determining a set of routes for the communication of data from a first wireless base station to a destination wireless base station over wireless backhaul communications links, the first wireless base station being an Integrated Access and Backhaul donor, receiving data of a first flow at the first wireless base station for communication to a first wireless user equipment device attached to the destination wireless base station; and selecting, at the first wireless base station, one or more of the routes of the set of routes from the first wireless base station to the destination wireless base station, the selection being based on multi-Radio Access Technology (multi-RAT) capability of wireless base stations of which a route is comprised.

20 Claims, 24 Drawing Sheets

(51) Int. Cl.
    *H04W 40/20*    (2009.01)
    *H04W 88/10*    (2009.01)

(56) References Cited

U.S. PATENT DOCUMENTS

| 2021/0045006 A1* | 2/2021 | Liu | H04W 28/22 |
| 2021/0298000 A1* | 9/2021 | Park | H04L 5/0098 |
| 2022/0131806 A1* | 4/2022 | Akl | H04L 47/24 |

FOREIGN PATENT DOCUMENTS

| WO | WO2022082602 | * 10/2020 |
| WO | WO2022071864 | * 9/2021 |

OTHER PUBLICATIONS

Technical Specification 5G; NG-RAN, F1 data transport, 3GPP TS 38.874 version 16.0.0 (Release 16), Jul. 2020, 10 pages.

3rd Generation Partnership Project; Technical Specification Group Radio Access Network; Evolved Universal Terrestrial Radio Access (E-UTRA); LTE-WLAN Aggregation Adaptation Protocol (LWAAP) specification (Release 15), 3GPP TS 36.360 V15.0.0, Jul. 2018, 10 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), 3GPP TS 36.300 V16.3.0, Sep. 2020, 390 pages.

\* cited by examiner

METHODS AND APPARATUS FOR MULTI-RADIO ACCESS TECHNOLOGY ACCESS AND BACKHAUL

FIELD OF INVENTION

The present invention relates to methods and apparatus for providing wireless backhaul services. More particularly, the present invention relates to methods and apparatus for providing wireless backhaul services in Integrated Access and Backhaul wireless networks.

BACKGROUND OF THE INVENTION

Integrated Access and Backhaul (IAB) was introduced in 3GPP Release 16 for New Radio as discussed in the 3GPP Technical Reference (TR) 38.874 v16.0.0, "Study on integrated access and backhaul (Release 16)," dated Dec. 18, 2018. This feature enables standardized support for in-band wireless backhaul links, enabling flexible and very dense deployment of New Radio (NR) wireless cells without the need for densifying the wired transport network proportionately. A typical use case is where Integrated Access and Backhaul is operated in millimeter-wave spectrum where large carrier bandwidths are available for wireless backhaul.

By way of background, an Integrated Access Backhaul-node (IAB-node) is a Radio Access Network (RAN) node that supports wireless access to User Equipment devices (UEs) and also acts as wireless backhaul for the access traffic. An IAB-donor is a RAN node which provides User Equipment's interface to the core network and wireless backhauling scheduling for IAB-nodes. The receiver functionalities at an IAB-node that would normally belong to a New Radio User Equipment device are referred to as mobile termination (MT). In a multi-hop scenario, the upstream IAB-node is referred to as a parent node, while a downstream IAB-node is known as a child node.

The 3GPP Release 16 for New Radio requirements support a network architecture option 1a for Integrated Access and Backhaul, where the donor is disaggregated into a gNB-CU (gNB-control unit) and a gNB-DU (gNB-distributed unit). A simple example of a one-hop Integrated Access Backhaul network with two access links and one backhaul link is shown in FIG. 1. The one-hop integrated access and backhaul (IAB) network 100 of FIG. 1 includes a donor node 102 connected to a fiber transport 116, a child node 104, and user equipment devices 106 and 108. The UE 108 is connected to the child node via wireless access link 112. The UE 106 is coupled to the donor node 102 via wireless access link 110. And, the child node 104 is coupled to the donor node 102 via a wireless backhaul link 114.

The 3GPP Release 16 New Radio requirements for Integrated Access and Backhaul introduced a new backhaul adaptation layer (BAP) above the Radio Link Control Layer for backhaul links. Diagram 200 of FIG. 2 illustrates Figure 4.2.1-1 from the 5G, NR; Backhaul Adaptation Protocol (BAP) specification (3GPP TS 38.340 version 16.1.0 Release 16 (ETSI TS 138 340 V16.1.0 (2020 July)). The 3rd Generation Partnership Project (3GPP) European Telecommunications Standards Institute (ETSI) Technical Specification (TS) 138 340 V16.1.0 (2020 July) 5G; NR: Backhaul Adaptation Protocol (BAP) specification (3GPP TS 38.340 version 16.1.0 Release 16) is hereby incorporated by reference in its entirety. FIG. 2 diagram 200 illustrates the structure of the Backhaul Adaptation Protocol (BAP) layer and its position above the Radio Link Control Layer. As described in the TS 38.340, "Backhaul Adaptation Protocol (BAP) specification," dated the new backhaul adaptation layer supports functions such as data transfer, routing of packets to next hop, determination of backhaul adaptation protocol destination and path for packets from upper layers, determination of egress Radio Link Control channels for packets routed to next hop, differentiating traffic to be delivered to upper layers from traffic to be delivered to egress link, flow control feedback signaling, and backhaul radio link failure indication. A functional view of the BAP sub-layer is shown in diagram 300 of FIG. 3. Diagram 300 is based on Figure 4.2.2-1 from TS 38.340, "Backhaul Adaptation Protocol (BAP) specification".

As described in the TS 38.340 specification section 4.2.2, the IAB-node, the BAP sublayer contains one BAP entity at the MT (Mobile Termination) function and a separate collocated BAP entity at the Distributed Unit (DU) function. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the BackHaul (BH) link. Backhaul RLC channel is a Radio Link Control (RLC) channel between two nodes, which is used to transport backhaul packets. The Ingress RLC channel is a Backhaul RLC channel on which a packet is received by a node. Egress RLC channel is a Backhaul RLC channel on which a packet is transmitted by a node. An Ingress link is a radio link on which a packet is received by a node. An Egress link is a radio link on which a packet is transmitted by a node.

In the example of FIG. 3 as described in the TS 38.340 specification section 4.2.2, the receiving part on the BAP entity delivers BAP Protocol Data Units (PDUs) to the transmitting part on the collocated BAP entity. It should also be noted that alternatively, the receiving part may deliver BAP Service Data Units (SDUs) to the collocated transmitting part. When passing BAP SDUs, the receiving part removes the BAP header and the transmitting part adds the BAP header with the same BAP routing ID as carried on the BAP PDU header prior to removal. Passing BAP SDUs as described is functionally equivalent to passing BAP PDUs, in implementation.

Diagram 600 of FIG. 6 which is Figure 6.2.2-1 of the TS 38.340 specification illustrates the BAP data Protocol Data Unit (PDU) structure that conveys the PDU header and upper layer data. It includes the following parameters/fields:
  (i) DESTINATION field which has a length of 10 bits and carries the BAP address of destination of IAB node or IAB-donor node.
  (ii) PATH field which has a length of 10 bits and carries the BAP path identity;
  (iii) Data field which is has variable bit length and carries the BAP Service Data Unit (i.e., the Internet Protocol packet);
  (iv) R field which has a length of 1 bit and is reserved for future use and is set to zero in Release 16 of the specification; and
  (v) D/C field which has a length of 1 bit and indicates whether the BAP PDU is a BAP Data PDU or a BAP Control PDU.

The BAP specifications, e.g., Release 16 and Release 17 IAB specifications, only support a single Radio Access Technology which is New Radio. Meanwhile, many Mobile Network Operators (MNOs) and Mobile Service Operators (MSOs) have already deployed wireless backhaul systems that are based on proprietary Radio Access Technologies (RATs) or Long Term Evolution (LTE) or Wi-Fi/WiGig technologies. For example, IEEE 802.1 lad (WiGig) is currently utilized by some operators for wireless backhaul in the 60 GHz unlicensed band.

As existing backhaul networks are upgraded to include New Radio Integrated Access and Backhaul, it is anticipated that for technical and/or business reasons a mix of heterogeneous backhaul Radio Access Technologies will exist during the migration. Additionally, it expected that wireless network operators will also intentionally deploy multi-RAT IAB networks in the future. For example, New Radio Integrated Access and Backhaul networks may operate on a different frequency/spectrum band compared to Wi-Fi or WiGig backhaul links. Millimeter-wave backhaul links are susceptible to blockage and severe attenuation. Multi-RAT backhauling provides additional robustness and adaptability to traffic loads since New Radio resources can be shifted to access links while other Radio Access Technologies handle backhaul traffic.

Furthermore, New Radio Integrated Access and Backhaul networks may operate on a different frequency/spectrum band compared to WiGig backhaul links. Millimeter-wave backhaul links are susceptible to blockage and severe attenuation. Multi-RAT backhauling if available could provides additional robustness and adaptability to traffic loads since New Radio resources can be shifted to access links while other Radio Access Technologies handle backhaul traffic.

From the foregoing, it will be appreciated that there is a need for new and/or improved methods and apparatus to solve the technological problem of how to provide Integrated Access and Backhaul capabilities in multi-Radio Access Technology systems. Furthermore, there is a need for new and/or improved methods and apparatus that can improve the efficiency, robustness and adaptability to traffic loads of Integrated Access and Backhaul networks through the support of multi-Radio Access Technologies.

SUMMARY OF THE INVENTION

The present invention includes novel methods and apparatus for providing a technological solution of how to provide Integrated Access and Backhaul capabilities in multi-Radio Access Technology systems. Furthermore, the present invention includes new and/or improved methods and apparatus that can improve the efficiency, robustness and adaptability to traffic loads of Integrated Access and Backhaul networks through the support of multi-Radio Access Technologies.

Various embodiments of the present invention include novel methods and apparatus to solve one or more of the problems identified above.

By using one or more of the techniques described herein a wireless base station can perform backhaul load balancing across IAB networks and make use of different Radio Access Technologies to increase backhaul data transmission efficiency, efficiency of spectrum usages and increase reliability of Integrated Access and Backhaul networks.

An exemplary wireless communications method embodiment in accordance with the present invention includes the steps of: The present invention relates to methods and apparatus for providing backhaul wireless services using a plurality of different Radio Access Technologies. An exemplary method embodiment includes the steps of: determining a set of routes for the communication of data from a first wireless base station to a destination wireless base station over wireless backhaul communications links, the first wireless base station being an Integrated Access and Backhaul donor, receiving data of a first flow at the first wireless base station for communication to a first wireless user equipment device attached to the destination wireless base station; and selecting, at the first wireless base station, one or more of the routes of the set of routes from the first wireless base station to the destination wireless base station, the selection being based on multi-Radio Access Technology (multi-RAT) capability of wireless base stations of which a route is comprised.

In most embodiments, the destination wireless base station and any other wireless base stations in the determined set of routes are Integrated Access and Backhaul nodes.

In some embodiments of the method, during establishment of each IAB node or link between nodes, broadcasting by the IAB node the non-3GPP RAT availability and capability to other IAB nodes and IAB donors to which it is connected. In some embodiments, the method further includes measuring by an established IAB node non-3GPP performance metrics over a first period of time; and broadcasting the measured non-3GPP performance metrics to other IAB nodes and/or IAB donors to which it is connected.

In some embodiments, the first wireless base station receives said data from a core network over a wired or fiber optic link. In some embodiments, the first flow is a first call flow.

In some embodiments, the first wireless user equipment device includes a 5G New Radio radio access technology wireless interface for receiving and transmitting messages.

In some embodiments, the method further includes the additional steps of: selecting, by the first wireless base station, a first route from the set of routes, said first route including a second wireless base station located between the first wireless base station and the destination wireless base station on the selected first route; transmitting, by the first wireless base station, to the second wireless base station the received data in Backhaul Offload Adaptation Protocol (BOAP) packets via a Radio Access Technology wireless communications link which is not 5G New Radio.

In some such embodiments, the backhaul Radio Access Technology wireless communications link is a non-3GPP Radio Access Technology. In various embodiments, the backhaul Radio Access Technology wireless communications link is one of the following: 802.11 ad, 802.11 ay, 802.11 ac, 802.11 ax, and 802.11 be.

In some embodiments, each of the wireless base stations in each determined route of the set of routes includes a plurality of 5G New Radio radio access technology wireless interfaces for receiving and transmitting messages.

In some embodiments, the method further includes prior to transmitting said Backhaul Offload Adaptation Protocol (BOAP) packets, generating, by the first wireless base station, said Backhaul Offload Adaptation Protocol (BOAP) packets, each generated Backhaul Offload Adaptation Protocol (BOAP) packet encapsulating one or more Backhaul Adaptation Protocol-Protocol Data Units (BAP-PDUs), said Backhaul Adaptation Protocol-PDUs containing said received data and a destination address of the destination wireless base station.

In some embodiments, the BAP-PDUs are inserted into the MAC frame body of a Wi-Fi or WiGig MAC frame without being first being encapsulated in BOAP packets.

In some embodiments, the method further includes the steps of: receiving, by the second wireless base station, the transmitted Backhaul Offload Adaptation Protocol (BOAP) packets via the backhaul Radio Access Technology wireless communications link which is not 5G New Radio; decapsulating, by the second wireless base station, the BAP-PDUs; extracting header information from the decapsulated BAP-PDUs; determining, by the second wireless base station, whether or not the second wireless base station is the destination for the received BAP-PDUs based on the extracted header information, and when the second wireless base station determines it is not the destination for the received BAP-PDUs, selecting one or more different wireless backhaul Radio Access Technology communications links to use for transmitting the received BAP-PDUs from the second wireless base station to a next hop in the first route to the destination wireless base station.

In some embodiments, the method further includes when a 5G New Radio RAT wireless backhaul link is selected to transmit the BAP-PDUs to the next hop, generating BAP-PDUs based on the received BAP-PDUs; and when a non-3GPP RAT wireless backhaul link is selected to transmit the BAP-PDUs to the next hop, generating BAP-PDUs based on the received BAP-PDUs and then generating BOAP packets which encapsulate the generated BAP-PDUs.

In some embodiments, the extracted header information is the destination address; and the second wireless base station determines whether or not the second wireless base station is the destination for the received BAP-PDUs by determining if the destination address in the header field of the BAP-PDUs matches an address of the second wireless base station.

In some embodiments, the selection, at the first wireless base station of the one or more of the routes of the set of routes from the first wireless base station to the destination wireless base station is further based on one or more of the following: (i) operation of a Radio Access Technology in licensed versus unlicensed spectrum, (ii) operation of a Radio Access Technology in sub-6 GHz versus mm-wave spectrum, (iii) performance metrics of a Radio Access Technology (throughput, access delay/jitter), (iv) delay budget and reliability requirement of the first flow, (v) number of transitions between Radio Access Technologies required by the route, (vi) number of Backhaul Adaptation Protocol to Backhaul Offload Adaptation Protocol transitions required by the route, (vii) number of Backhaul Offload Adaptation Protocol to Backhaul Adaptation Protocol transitions required by the route.

In some embodiments, the selection of one or more of the routes of the set of routes from the first wireless base station to the destination wireless base station is further based on one or more attributes of the first flow. In some embodiments, the attributes of the first flow include one or more of the following: a quality of service requirement, a reliability requirement and a delay budget.

In some embodiments, the method further includes the steps of: selecting multiple routes from the set of routes when the first flow reliability requirement attribute is greater than a first threshold value; and transmitting the same data of the first flow across the selected multiple routes from the first wireless base station to the destination wireless base station concurrently or in parallel.

In some embodiments, the first wireless base station is a multi-Radio Access Technology device capable of communicating using a first Radio Access Technology and a second Radio Access Technology, said first Radio Access Technology being 5G New Radio radio access technology and said second Radio Access Technology being a non-3GPP Radio Access Technology, the first wireless base station selects a first route from the set of routes, said first route including a second wireless base station connected to the first wireless base station via a first RAT wireless backhaul link and a second RAT wireless backhaul link; and the second wireless base station is a multi-Radio Access Technology device capable of communicating using said first Radio Access Technology and said second Radio Access Technology.

In various embodiments, the second Radio Access Technology is one of 802.11ad radio access technology, 802.11 ay radio access technology, 802.11 ac radio access technology, 802.11 be radio access technology, or 802.11 ax radio access technology.

In some embodiments, the wireless communications method of further includes the steps of: determining, by the first wireless base station, a first portion of the data received by the first wireless base station to communicate to the second wireless base station over the second RAT wireless backhaul link; generating, by the first wireless base station, one or more Backhaul Adaptation Protocol Data Protocol Data Units containing data from the first portion of data received by the first wireless base station; generating, by the first wireless base station, one or more Backhaul Offload Adaptation Protocol packets including one or more Backhaul Adaptation Protocol Data Protocol Data Units containing data from the first portion of data received by the first wireless base station.

In some embodiments, the step of generating, by the first wireless base station, one or more Backhaul Adaptation Protocol Data Protocol Data Units containing data from the first portion of data received by the first wireless base station includes generating a first Backhaul Adaptation Protocol Data Protocol Data Unit including a header with the destination address of the destination wireless base station being included in the destination header field; and the step of generating, by the first wireless base station, one or more Backhaul Offload Adaptation Protocol packets including one or more Backhaul Adaptation Protocol Data Protocol Data Units containing data from the first portion of data received by the first wireless base station includes encapsulating the first Backhaul Adaptation Protocol Data Protocol Data Unit in a first Backhaul Offload Adaptation Protocol packet.

In various embodiments of the method further includes inserting the first Backhaul Offload Adaptation Protocol packet in a frame body, data payload or packet data unit of a second Radio Access Technology protocol message (e.g., in the data field of the WiGig Protocol Data Unit).

In some embodiments, the second RAT is 802.11 ay; and the first Backhaul Offload Adaptation Protocol packet is inserted into a frame body of a 802.11 ay MAC frame.

In some embodiments, the wireless communications method of includes the additional step of: transmitting from the first wireless base station to the second wireless base station over the second RAT wireless backhaul link the one or more generated Backhaul Offload Adaptation Protocol packets.

In various embodiments, the wireless communications method of further includes the steps of: determining, by the first wireless base station, a second portion of the data received by the first wireless base station to communicate to the second wireless base station over the first RAT wireless backhaul link; generating, by the first wireless base station, one or more Backhaul Adaptation Protocol Data Protocol Data Units containing data from the second portion of data received by the first wireless base station; and transmitting from the first wireless base station to the second wireless base station over the first RAT wireless backhaul link the one or more generated Backhaul Adaptation Protocol Data Protocol Data Units containing the second portion of data received by the first wireless base station.

The present invention is also applicable to and includes apparatus and systems such as for example, apparatus and systems that implement one or more of the steps of the method embodiments. An exemplary communications system in accordance with the present invention includes a wireless base station including: memory; and a processor included in the wireless base station which controls the operation of the wireless base station to perform the following operations: (i) determine a set of routes for the communication of data from the first wireless base station to a destination wireless base station over wireless backhaul communications links, the first wireless base station being an Integrated Access and Backhaul donor, (ii) receive data of a first flow at the first wireless base station for communication to a first wireless user equipment device attached to the destination wireless base station; and select, at the first wireless base station, one or more of the routes of the set of routes from the first wireless base station to the destination wireless base station, the selection being based on multi-Radio Access Technology (multi-RAT) capability of wireless base stations of which a route is comprised.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 13 illustrates the combination of FIGS. 13A and 13B.

FIG. 16 F illustrates the steps of the sixth part of an exemplary method in accordance with one embodiment of the present invention.

FIG. 16 G illustrates the steps of the seventh part of an exemplary method in accordance with one embodiment of the present invention.

DETAILED DESCRIPTION

The current invention is applicable to wireless networks, e.g., New Radio 5G wireless networks, that provide wireless communications services, e.g., broadband services to user equipment devices. In various embodiments of the present invention, the wireless communications network implements a multi-RAT IAB system architecture. Both IAB-nodes and IAB-donors may, and in some embodiments do, employ multiple Radio Access Technologies on one or more frequency bands (in licensed and/or unlicensed spectrum), for both access and backhaul links. In some embodiments, the IAB-nodes and IAB-donors use multiple Radio Access Technologies simultaneously for the same call as multiple paths or routes are used to transmit call data.

Figure 11:
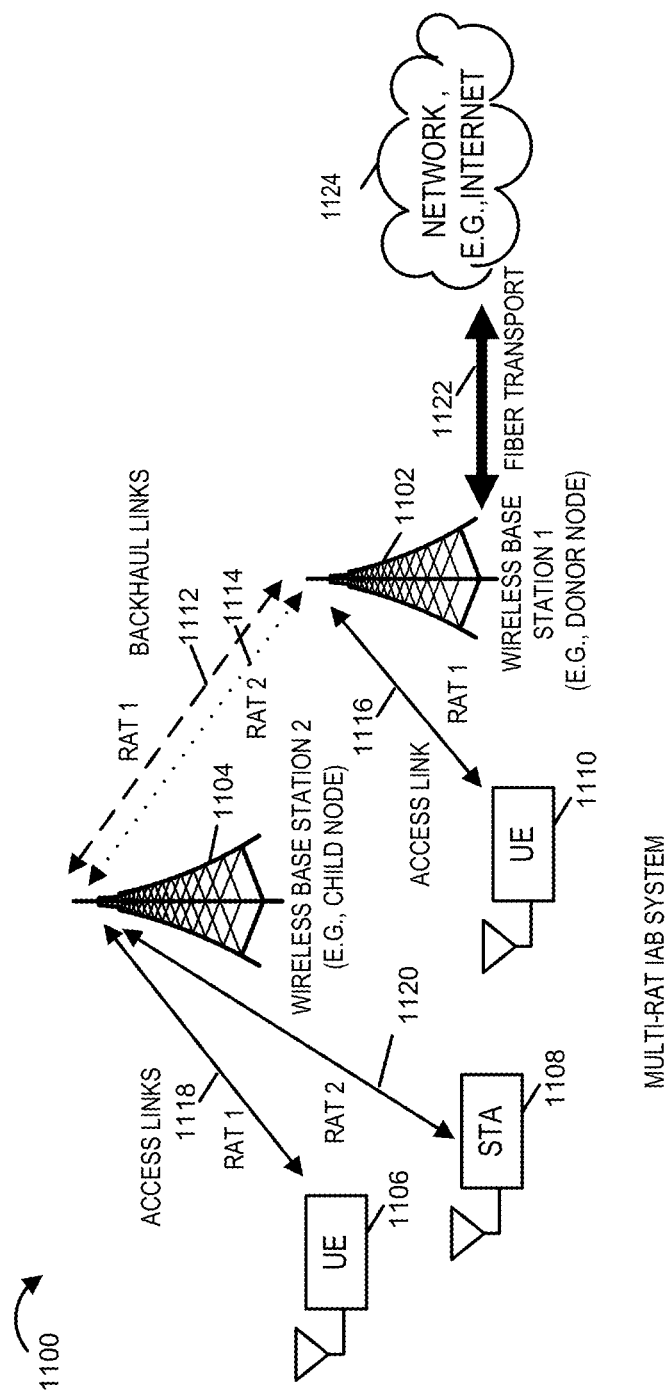
FIG. 11 illustrates an exemplary multi-RAT IAB wireless communications system in accordance with an embodiment of the present invention.

FIG. 11 illustrates an exemplary communications system 1100 illustrated as a wireless network communications system having an architecture implemented in accordance with an embodiment of the present invention and being coupled to a network 1124 (e.g., the Internet) via communications link 1122, e.g., a fiber optic communications link sometime referred to as a fiber transport. The communications system 1100 is a multi-RAT Integrated Access and Backhaul system. The communications system 1100 utilizes two Radio Access Technologies referred to as RAT 1 and RAT 2. RAT 1 in the communications system 1100 is 3rd Generation Partnership Project 5G New Radio radio access technology. RAT 2 in this example is 802.11ay WLAN radio access technology. It is to be understand that while only two RATs are illustrated additional RATs may be, and in some embodiments are utilized. Additionally, the particular radio access technologies used in the embodiments, e.g., 802.11ay radio access technology, is only example and other radio access technologies may be, and in some embodiments are utilized. The particular radio access technologies may be, and in some embodiments are, based on the existing technology deployed by the wireless operator and/or employed by a wireless base station. In some embodiments, the radio access technology is based on one or more environmental factors in which the system is deployed, e.g., geography, topology, type of traffic to be communicated, distances between base stations, coverage areas, density of user equipment devices, number of user equipment devices deployed, etc.

The communications system 1100 includes a plurality of wireless base stations including 3rd Generation Partnership Project 5G New Radio Backhaul Adaptation Protocol capabilities and support for a plurality of different radio access technologies (i.e., wireless base station 1 1102 (e.g., Integrated Access and Backhaul (IAB) donor node) and wireless base station 2 1104 (e.g., an IAB child node), a plurality of wireless endpoint devices (i.e., User Equipment device 1106, WILAN Station 1108 and User Equipment device 1110), and a plurality of communications links 1112, 1114, 1116, 1118, 1120 and 1122. The wireless system 1100 is coupled to a network 1124, e.g., the Internet, via a fiber transport communications link 1122 which connects or couples wireless base station 1102 to network 1124.

As previously mentioned, RAT 1 in the wireless communications system 1100 is 5G New Radio (NG) and RAT 2 is 802.11 ay WiGig radio technology. Wireless base station 1 and wireless base station 2 are multi-RAT Integrated Access and Backhaul nodes with Station receiver functionality in addition to Mobile Termination functionality. UE 1106 is a user equipment device with a 5G New Radio interface. STA 1108 is a endpoint wireless device with a 802.11 ay WiGig radio interface. UE 1110 is a user equipment device with a 5G New Radio Interface. UE 1106, STA 1108, UE 1110 are wireless devices such as for example, smartphones, computes, mobile devices, smart devices, laptops, mobile phones, and tablets.

In an exemplary embodiment of the present invention, the Backhaul Adaptation Protocol is modified for the multi-RAT case by allocating Radio Link Control Egress/Ingress channels over one or more of the available Radio Access Technologies (RATs). The BAP sublayer of the Integrated Access and Backhaul-distributed unit (IAB-du) is able to send some packets, i.e., Backhaul Adaptation Protocol Protocol Data Units (BAP-PDUs), over RAT 1 and some packets, i.e., Backhaul Adaptation Protocol Protocol Data Units, over RAT 2. The Backhaul Adaptation Protocol sublayer of the Integrated Access and Backhaul-Mobile Termination correspondingly receives some packets, i.e., BAP-PDUs, over RAT 1 and some packets, i.e., BAP-PDUs, over RAT 2.

Figure 12:
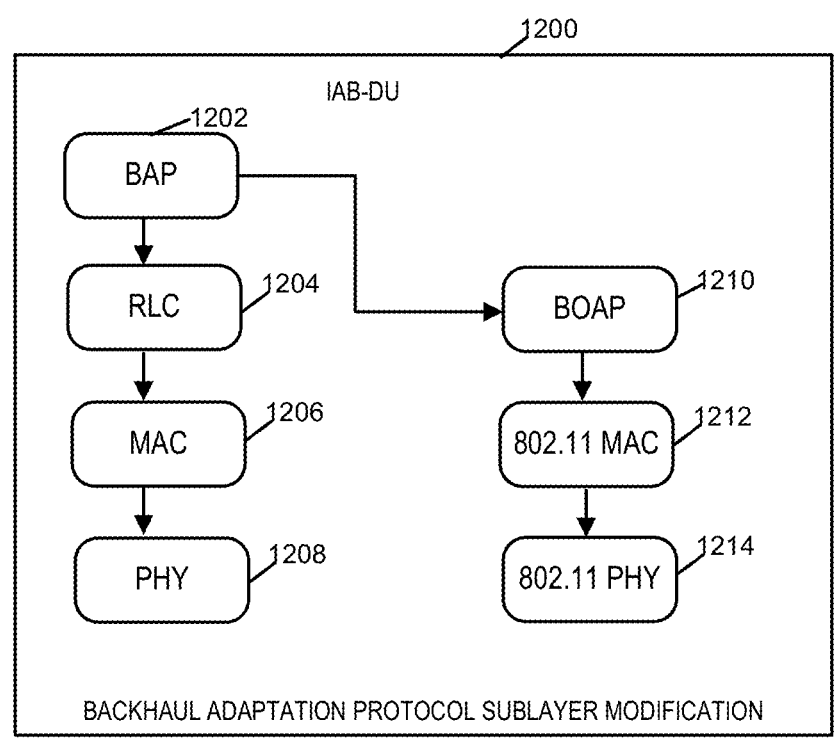
FIG. 12 illustrates a backhaul offload adaptation protocol sublayer modification introduced to encapsulate BAP PDUs before offloading to the non-3GPP access link in accordance with an embodiment of the present invention.

An example from the perspective of a transmitting BAP entity, e.g., wireless base station IAB-distributed unit, is illustrated in diagram 1200 of FIG. 12. RAT 1 is 5G New Radio and RAT 2 is a non-3GPP radio access technology such as for example WiGig. A new adaptation layer termed Backhaul Offload Adaptation Protocol (BOAP) is introduced to encapsulate Backhaul Adaptation Protocol-Protocol Data Units before offloading to the non-3GPP access, e.g., the RAT 2 WiGig radio access technology access interface for transmission over the RAT 2 wireless link. The encapsulation process is reversed at the receiving BAP entity, e.g., wireless base station with a WiGig Station/receiving functionality. BAP-PDUs can contain either data or control information. While the encapsulation of BAP data PDUs by a Backhaul Offload Adaptation Protocol entity is discussed in detail the same process may be, and in some embodiments is, used to encapsulate BAP control PDUs which contain control information, e.g., information for flow control feedback. It is to be understood that the wireless communication links shown in system 1100 are only exemplary and other network configurations and communications links may be employed that couple together the wireless endpoint devices (e.g., user equipment devices and stations), wireless base stations (e.g., IAB donor and child nodes), in system 1100. Elements or steps with the same reference numbers used in different figures are the same or similar and those elements or steps will not be described in detail again.

The wireless communications system 1100 illustrated in FIG. 11 includes an exemplary one hop multi-Radio Access Technology (RAT) Integrated Access and Backhaul (IAB) system in accordance with an embodiment of the present invention. While for the sake of simplicity in explaining the invention system 1100 only illustrates a two wireless base stations shown and three wireless endpoint devices, i.e., user equipment device 1106, user equipment device 1110 and STA 1108, it will be appreciated that system 1100 typically includes a large plurality of wireless base stations through which a large number of wireless devices, e.g., user equipment devices and stations, access the wireless network and through which the wireless devices are provided services.

Figure 15:
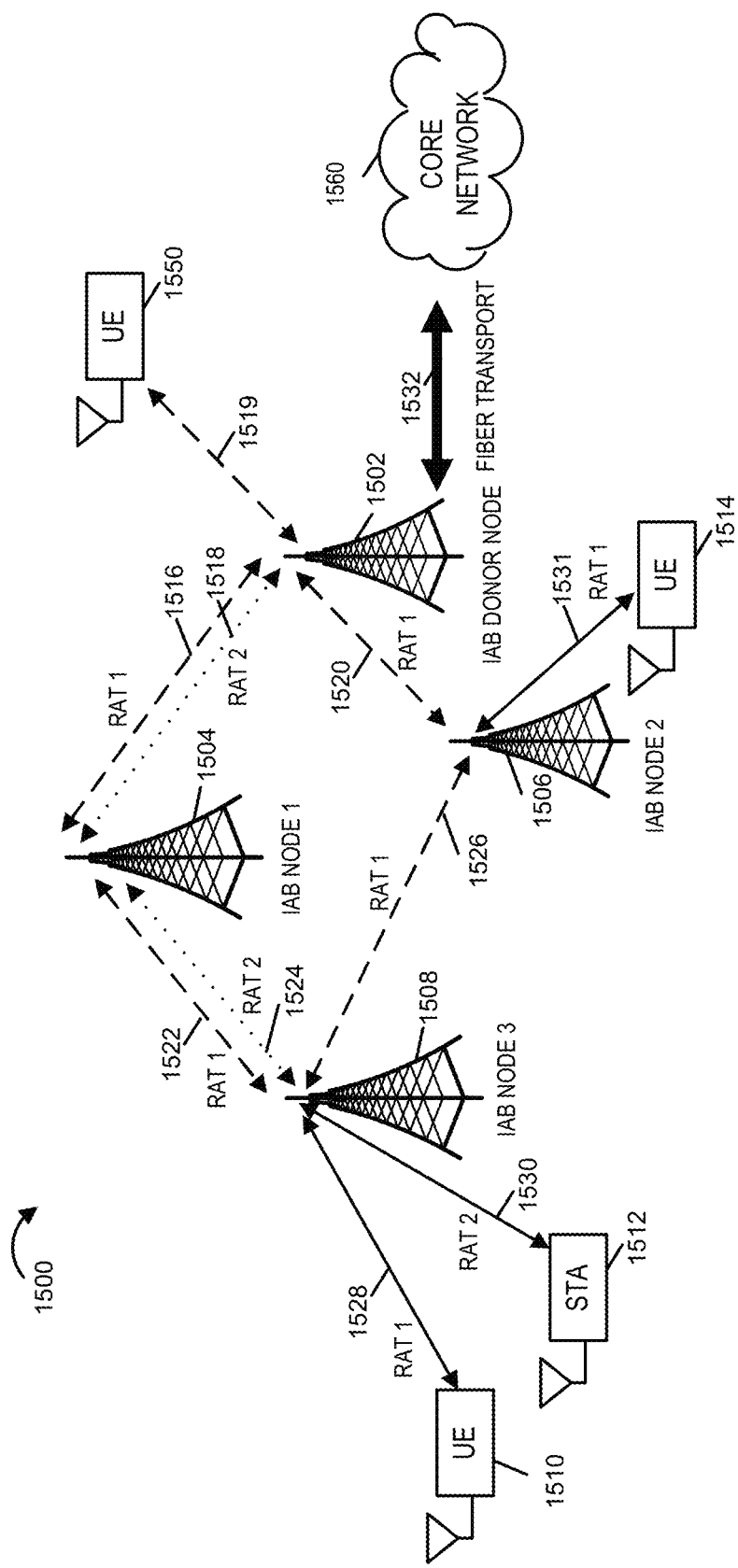
FIG. 15 illustrates an exemplary system embodiments of the present invention.

FIG. 15 illustrates a wireless communications system 1500 which includes a multi-hop multi-RAT Integrated Access and Backhaul wireless communication system in accordance with another embodiment of the present invention. System 1500 illustrated is a wireless network communications system having an architecture implemented in accordance with another embodiment of the present invention and is coupled to a network 1560 (e.g., the Internet) via communications link 1532, e.g., a fiber optic communications link sometime referred to as a fiber transport. The communications system 1500 is a multi-RAT Integrated Access and Backhaul system. The communications system 1500 utilizes two Radio Access Technologies referred to as RAT 1 and RAT 2. RAT 1 in the communications system 1500 is 3rd Generation Partnership Project 5G New Radio radio access technology. RAT 2 in this example is 802.11 ay WLAN radio access technology. It is to be understand that while only two RATs are illustrated additional RATs may be, and in some embodiments are utilized. Additionally, the particular radio access technologies used in the embodiments, e.g., 802.11 ay radio access technology, is only exemplary and other radio access technologies may be, and in some embodiments are utilized. The particular radio access technologies may be, and in some embodiments are, based on the existing technology deployed by the wireless operator and/or employed by a wireless base station. In some embodiments, the radio access technology is based on one or more environmental factors in which the system is deployed, e.g., geography, topology, type of traffic to be communicated, distances between base stations, coverage areas, density of user equipment devices, number of user equipment devices deployed, etc.

The communications system 1500 includes a plurality of wireless base stations including 3rd Generation Partnership Project 5G New Radio Backhaul Adaptation Protocol capabilities and support for a plurality of different radio access technologies (i.e., wireless base station 1 1502 (e.g., Integrated Access and Backhaul (IAB) donor node), wireless base station 2 1504 (e.g., IAB node 1), wireless base station 2 1506 (e.g., IAB node 2), wireless base station 4 1508 (e.g., IAB node 3)); a plurality of wireless endpoint devices (i.e., User Equipment device 1510, WLAN Station 1512, User Equipment device 1514, User Equipment 1550), and a plurality of communications links 1516, 1518, 1519 1520, 1522, 1524, 1526, 1528, 1530, and 1531. The wireless system 1100 is coupled to a network 1124, e.g., the Internet, via a fiber transport communications link 1530 which connects or couples wireless base station 1 (IAB donor node) 1502 to network 1560.

As previously mentioned, RAT 1 in the wireless communications system 1500 is 5G New Radio (NG) and RAT 2 is 802.11 ay WiGig radio technology. Wireless base station 1 (IAB donor node) 1502, wireless base station 2 (IAB node 1), and wireless base station 4 (IAB node 3) 1508 are multi-RAT Integrated Access and Backhaul nodes with Station receiver functionality in addition to Mobile Termination functionality. These wireless base station support both RAT 1 and RAT 2 wireless access technologies as they have RAT 1 and RAT 2 capabilities and are multi-RAT devices. Wireless base station 2 (IAB node 2) is not a multi-RAT IAB node. Wireless base station 2 (IAB node 2) only supports RAT 1 which is 5G New Radio radio access technology. UE 1510 is a user equipment device with a 5G New Radio interface. STA 1512 is an endpoint wireless device with a 802.11 ay WiGig radio interface. UE 1514 and UE 1550 are user equipment device with a 5G New Radio Interface. UE 1510, STA 1512, UE 1514, UE 1550 are wireless devices such as for example, smartphones, computes, mobile devices, smart devices, laptops, mobile phones, and tablets.

Communications link 1516 is a RAT 1 wireless backhaul communications link that couples and/or connects wireless base station 1 (IAB donor node) 1502 to wireless base station 2 (IAB node 1) 1504. Communications link 1518 is a RAT 2 wireless backhaul communications link that couples and/or connects wireless base station 1 (IAB donor node) 1502 to wireless base station 2 (IAB node 1) 1504. Communications link 1520 is a RAT 1 wireless backhaul communications link that couples and/or connects wireless base station 1 (IAB donor node) to wireless base station 3 (IAB node 2) 1506. Communications link 1519 is a RAT 1 wireless access communications link that couples/connects wireless base station 1 (IAB donor) to UE 1550. Communications link 1522 is a RAT 1 wireless backhaul communications link that couples and/or connects wireless base station 2 (IAB node 1) 1504 to wireless base station 4 (IAB node 3) 1508. Communications link 1524 is a RAT 2 wireless backhaul communications link that couples and/or connects wireless base station 2 (IAB node 1) 1504 to wireless base station 4 (IAB node 3) 1508. Communication link 1526 is a RAT 1 wireless backhaul communications link that couples and/or connects wireless base station 2 (IAB node 1) 1504 to wireless base station 3 (IAB node 2) 1506. Communications link 1528 is a RAT 1 wireless access link that couples and/or connects User Equipment 1510 to wireless base station 4 (IAB node 3) 1508. Communications link 1530 is a RAT 2 wireless access link that couples and/or connects STA 1512 to wireless base station 4 (IAB node 3) 1508. Communications link 1531 is a RAT 1 wireless access link that couples and/or connects User Equipment device 1514 to wireless base station 2 (IAB node 2) 1506.

As in the exemplary system 1100, the exemplary system 1500 the Backhaul Adaptation Protocol is modified for the multi-RAT case by allocating Radio Link Control Egress/Ingress channels over one or more of the available Radio Access Technologies (RATs). The BAP sublayer of the Integrated Access and Backhaul-distributed unit (IAB-du) is able to send some packets, i.e., Backhaul Adaptation Protocol Protocol Data Units (BAP-PDUs), over RAT 1 and some packets, i.e., Backhaul Adaptation Protocol Protocol Data Units, over RAT 2. The Backhaul Adaptation Protocol sublayer of the Integrated Access and Backhaul-Mobile Termination correspondingly receives some packets, i.e., BAP-PDUs, over RAT 1 and some packets, i.e., BAP-PDUs, over RAT 2.

Also as previously discussed in connection with system 1100, an example from the perspective of a transmitting BAP entity, e.g., wireless base station IAB-distributed unit, is illustrated in diagram 1200 of FIG. 12. RAT 1 is 5G New Radio and RAT 2 is a non-3GPP radio access technology such as for example WiGig. A new adaptation layer termed Backhaul Offload Adaptation Protocol (BOAP) is introduced to encapsulate Backhaul Adaptation Protocol-Protocol Data Units before offloading to the non-3GPP access, e.g., the RAT 2 WiGig radio access technology access interface for transmission over the RAT 2 wireless link. The encapsulation process is reversed at the receiving BAP entity, e.g., wireless base station with a WiGig Station/receiving functionality. It is to be understood that the wireless communication links shown in system 1500 are only exemplary and other network configurations and communications links may be employed that couple together the wireless endpoint devices (e.g., user equipment devices and stations), wireless base stations (e.g., IAB donor and IAB nodes), in system 1500.

While for the sake of simplicity in explaining the invention system 1500 only illustrates four wireless base stations and a few wireless endpoint devices, i.e., user equipment device 1510, user equipment device 1514 and STA 1512, it will be appreciated that system 1500 typically includes a large plurality of wireless base stations through which a large number of wireless devices, e.g., user equipment devices and stations, access the wireless network and through which the wireless devices are provided services.

Figure 17:
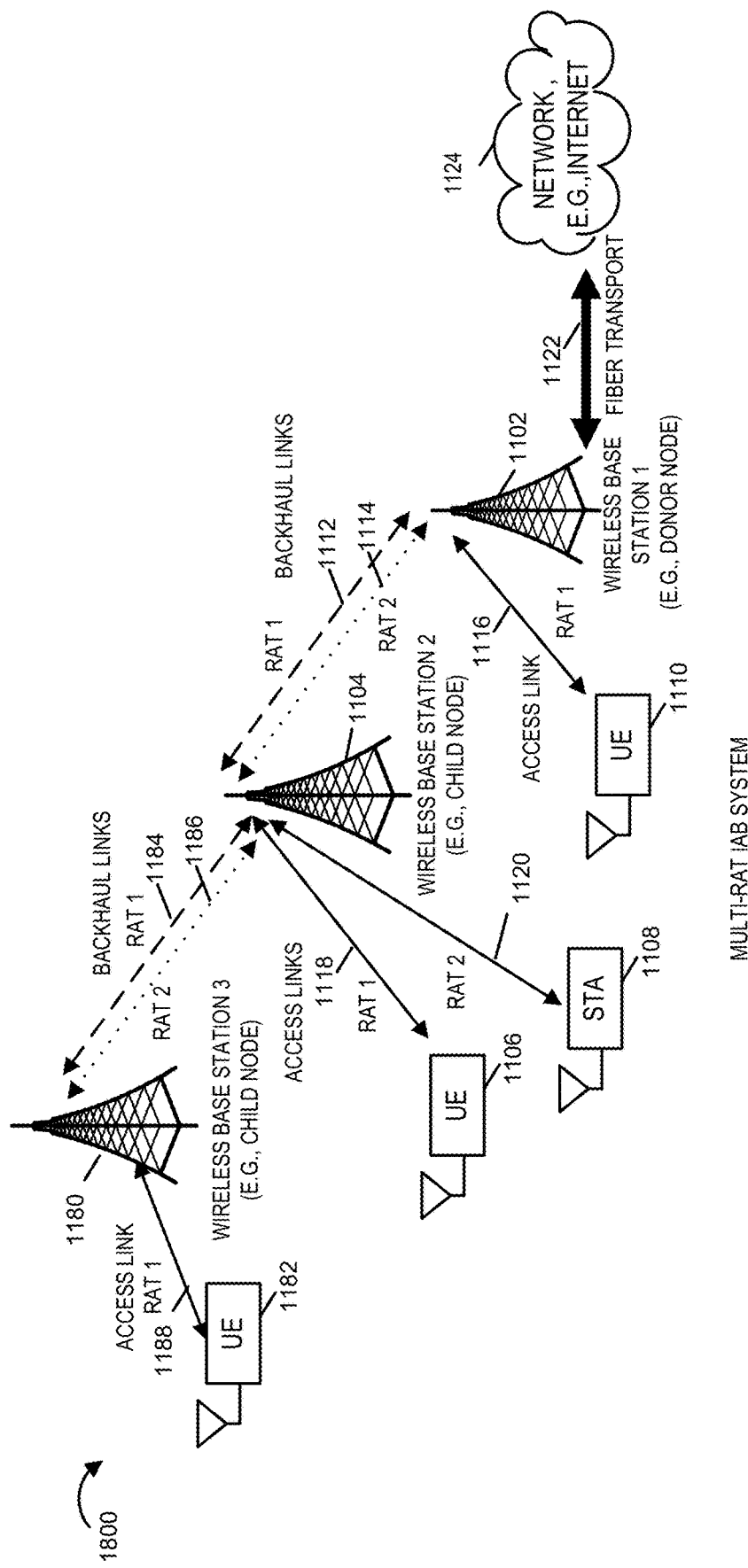
FIG. 17 illustrates another exemplary multi-RAT IAB wireless communications system in accordance with an embodiment of the present invention.

FIG. 17 illustrates another exemplary communications system 1800 illustrated as a wireless network communications system. The communications system 1800 is a multi-RAT Integrated Access and Backhaul system. The communications system 1800 is the communications system 1100 with the addition of a third wireless base station, i.e., wireless base station 1180, which is connected to wireless base station 2 1104 via wireless backhaul communications links 1184 and 1186. Wireless backhaul communications link 1184 being a RAT 1 radio access technology and wireless backhaul communications link 1186 being a RAT 2 radio access technology. The wireless base station 3 1180 is connected to a user equipment device 1182 via RAT 1 wireless access link 1188. Two hops are required to transmit data from wireless base station 1, (IAB donor) to wireless base station 3 1180 for communication to the UE 1182. The wireless base station 2 1104 is a parent IAB node to wireless base station 3 1180.

In most, but not all, embodiments of the invention in which the IAB system includes a multi-hop network, the IAB donor node considers multi-RAT capability of each IAB node as well as in many cases a history of the performance of each RAT in evaluating and selecting a route or path to a destination IAB node from the IAB donor node. During establishment of an IAB node, the availability, capability, and performance of non-3GPP RATs are broadcast by the IAB node so that the other nodes in the network become aware of the additional RAT or RATs available at the IAB node. In some embodiments, the IAB node includes in the broadcast information a recent history of the performance of each non-3GPP RAT. Furthermore, the IAB node may, and in most embodiments does, send update broadcast messages which include updated performance measurements or statistics for the non-3GPP RATs. For example, in some embodiments upon the IAB node detecting a significant change to a non-3GPP RAT's performance measurements and/or statistics, the IAB node broadcasts a notification of the change in performance of the RAT.

An IAB donor node will typically but not always consider multi-RAT capability and performance of IAB child nodes in route/path selection. The IAB donor node may for example assign weights to an IAB child node with multi-RAT capability, such that the IAB node may use two or more RATs to relay one or more flows (load-balancing in favor of a node with multi-RAT capability).

In some embodiments, due to the complexity of multi-RAT routing, routing of a flow may be restricted to one RAT in each multi-RAT capable IAB node to reduce the complexity.

In selecting a path or route to destination IAB node, an IAB donor node in some embodiments evaluates the priority of various routes based on one or more of the following characteristics of a route: (i) route or path where all IAB donor nodes are 3GPP RAT capable (e.g., only New Radio RAT), and (ii) route where some IAB donor nodes are multi-RAT capable (e.g., RAT 1/2/3 are New Radio, 802.11 ad/ay, and 802.11 ac/ax). The priority evaluation may be, and in some embodiments is, based on one or more of the following metrics: (i) operation of a RAT in licensed vs. unlicensed spectrum, (ii) operation of RAT in sub-6 GHz vs. mm-wave spectrum, (iii) performance metrics of a RAT such as for example, throughput, access delay, and jitter; (iv) number of BAP to/from BOAP transitions, and (v) delay budget and reliability requirement(s) of the flow.

In some embodiments, the IAB donor sometimes referred to as a donor node may determine a flow is to be routed across more than one route based on the attributes of the flow such as for example delay budget and reliability requirements.

An example of various routes/paths that an IAB donor node may, and in some embodiments does, evaluate is now described in connection with system 1500 shown in FIG. 15. The wireless base station 1 (IAB donor node) 1502 has a number of routes/paths available for a user equipment device connected to wireless base station 4 (IAB node 3) 1508. One route/path via wireless base station 3 (IAB node 2) 1506 uses only RAT 1 wireless backhaul links (i.e., wireless backhaul link 1520 which couples/connects wireless base station 1 (IAB donor node 1) 1502 to wireless base station 3 (IAB node 2) 1506 and wireless back haul link 1526 which connects wireless base station 3 (IAB node 2) 1506 to wireless base station 4 (IAB node 3) 1508. Other routes/paths via wireless base station 2 (IAB node 1) 1504 may use entirely RAT 1 wireless backhaul links, entirely RAT 2 wireless backhaul links or a mixture of RAT 1/RAT 2 wireless backhaul links. The IAB donor node evaluates the various routes and prioritizes them based one or more of the metrics listed above. Additionally, the IAB donor node may base its route/path decision on the ability of the wireless base station 2 (IAB node 1) to perform load balancing therein favoring routes/paths via wireless base station 2 (IAB node 1) due to multiple RAT availability.

Figure 13A:
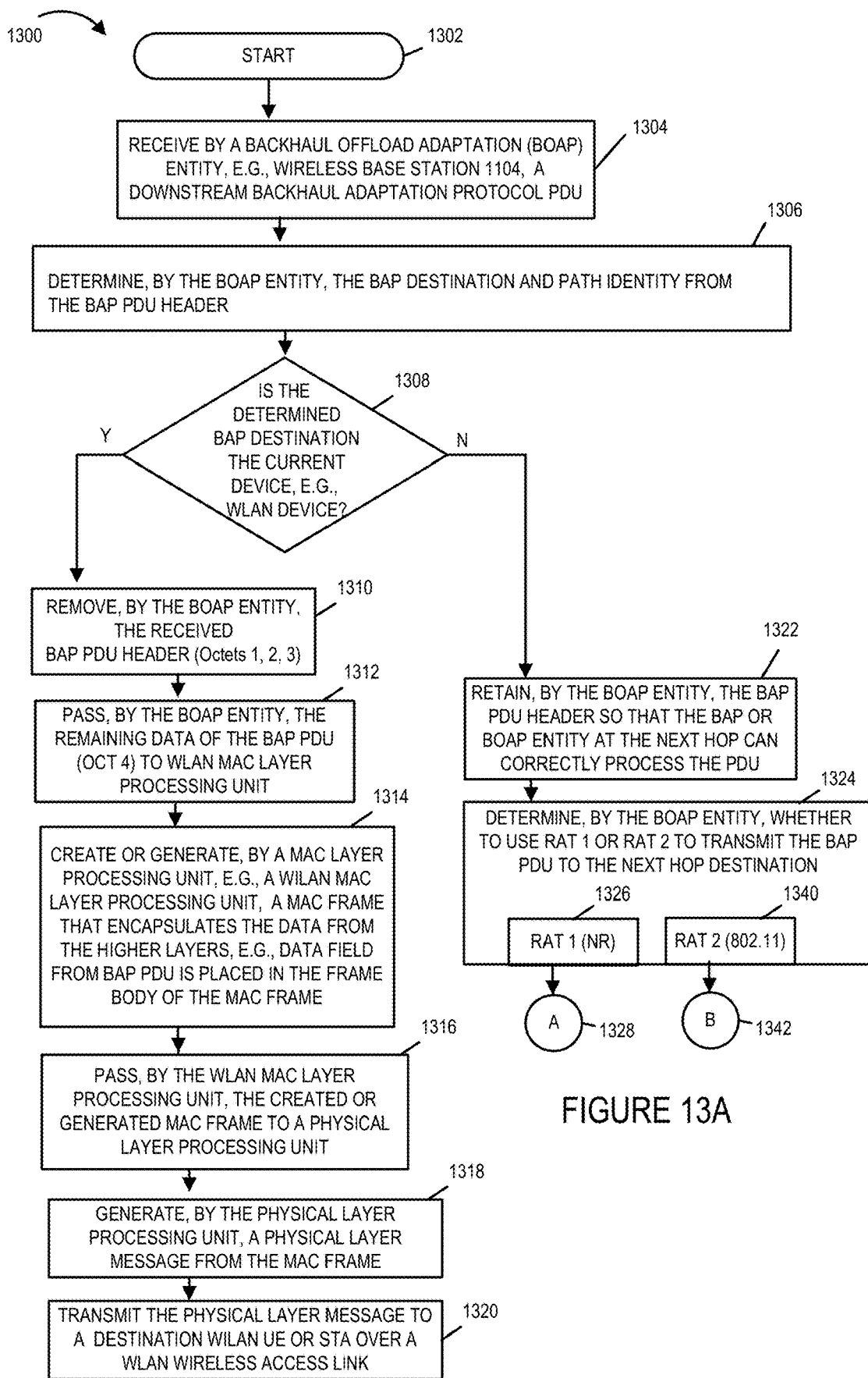
FIG. 13A illustrates the steps of the first part of an exemplary method in accordance with an embodiment of the present invention.
Figure 13B:
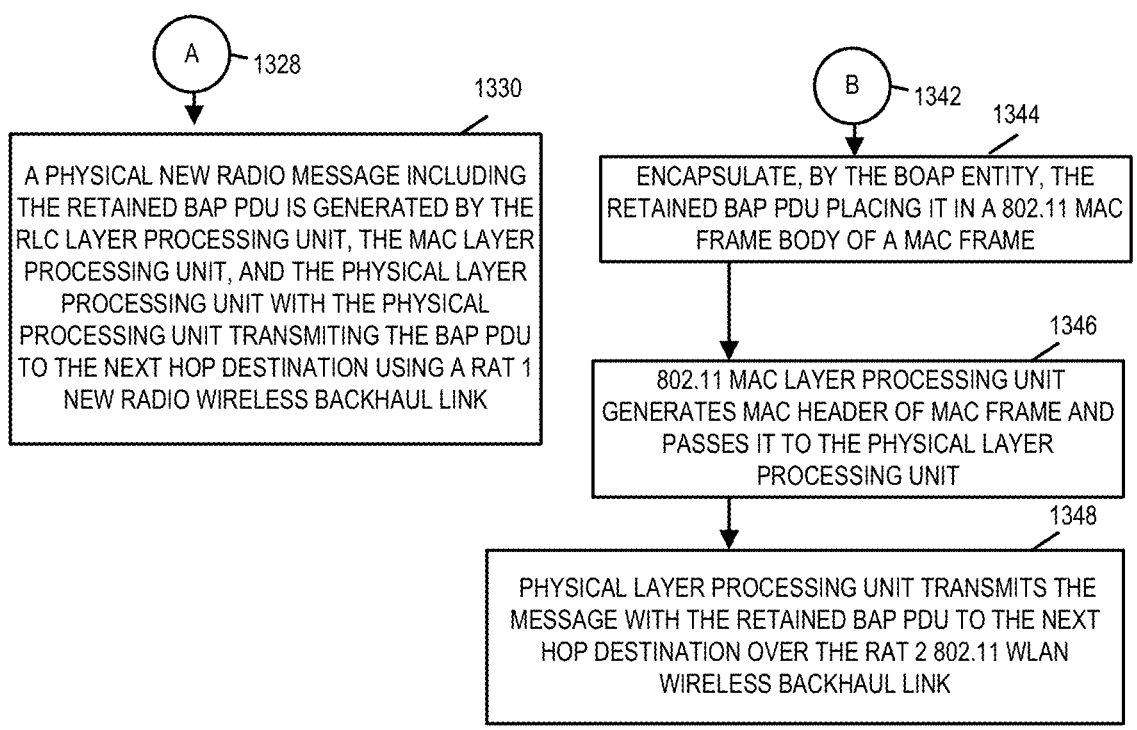
FIG. 13B illustrates the steps of the second part of an exemplary method in accordance with an embodiment of the present invention.

FIG. 13 comprises FIG. 13A and FIG. 13B. FIG. 13 is a flowchart of an exemplary method 1300 in accordance with an embodiment of the present invention which shows the operations/steps performed by Backhaul Offload Adaptation Protocol entity when receiving downstream Backhaul Adaptation Protocol-Protocol Data Units. FIG. 13A is a first part of a flowchart showing the steps of exemplary method 1300. FIG. 13B is a second part of a flowchart showing the steps of exemplary method 1300. For explanatory purposes, the method 1300 will be described in connection with its implementation on exemplary systems 1100 and 1800 shown in FIGS. 11 and 17 respectively. However, it should be understood that the method 1300 is not limited to system 1100 but may be implemented on various other systems with system 1100 merely being an exemplary system. For example, the method 1300 may be, and in some embodiments is, implemented on system 1500 shown in FIG. 15.

Method 1300 starts in start 1302. Operation proceeds from start step 1300 to step 1304.

In step 1304, a Backhaul Offload Adaptation (BOAP) entity, e.g., wireless base station 1104, receives a downstream backhaul adaptation protocol-PDU. The downstream backhaul adaptation protocol-PDU being received for example from another wireless base station, e.g., wireless base station 1102, over a wireless link, e.g., RAT 2 1114 which is in the example is not a 5G New Radio wireless link but a 802.11 WiGig wireless backhaul link. Operation proceeds from step 1304 to step 1306.

Figure 6:
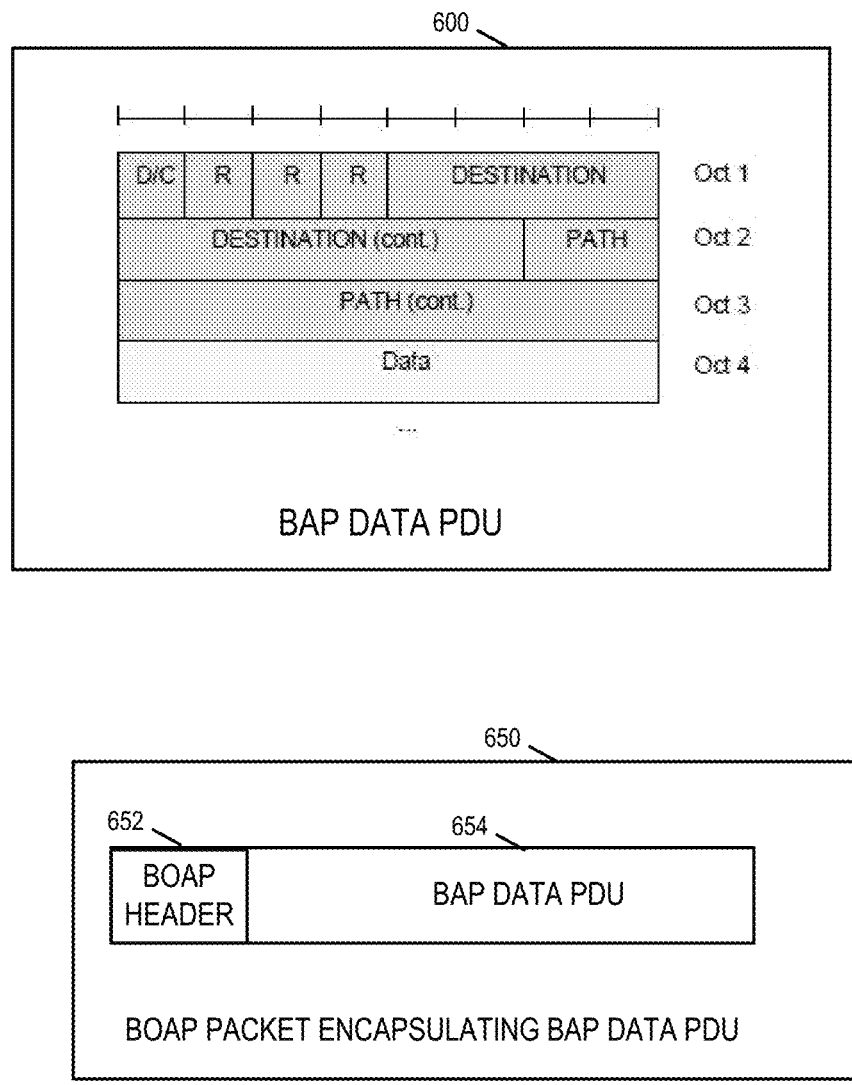
FIG. 6 illustrates details of the structure of a Backhaul Adaptation Protocol-Protocol Data Unit and the structure of an exemplary Backhaul Offload Adaptation Protocol packet.

In step 1306, the BOAP entity determines the Backhaul Adaptation Protocol destination address and Backhaul Adaptation Protocol path identity from the BAP PDU header. For example by extracting the BAP destination address from the BAP PDU header destination filed and BAP path identity from the BAP PDU header Path field. The BAP destination and BAP path field are shown in the diagram 600 of FIG. 6 which shows the structure of the BAP PDU. Operation proceeds from step 1306 to decision step 1308.

In decision step 1308, the BOAP entity determines whether the BAP destination is the current device, e.g., wireless base station 1104 which is a WLAN device as it received the BAP PDU from wireless base station 1102 over RAT 2 backhaul link which is a 802.11 WiGig wireless backhaul link in this example. For example, the BOAP entity determines whether the determined BAP destination address is the address of the receiving BOAP entity, e.g., wireless base station 2 1104's address. This may be done by comparing the determined BAP destination address to the address of the wireless base station. When the comparison results in a match the current device, e.g., wireless base station 2 1104, is determined to be BAP destination. When it is not a match the current device is determined not to be the BAP destination. Operation proceeds from step 1308 to step 1310 when the determination in decision step 1308 is that the BAP destination for the BAP PDU is the current device, e.g., wireless base station 2 1104. Operation proceeds from step 1308 to step 1322 when the determination in decision step 1308 is that the BAP destination of the BAP PDU is not the current device.

In step 1310, the BOAP entity removes the BAP PDU Header (octets 1, 2, and 3 of the BAP PDU). In this example, the BAP PDU is a data PDU which is determined by the BOAP entity from bit 1 of the BAP PDU as shown in diagram 600 of FIG. 6. Operation proceeds from step 1310 to step 1312.

In step 1312, the BOAP entity, passes the remaining data of the received BAP PDU (octet 4) to a MAC Layer processing unit, e.g., a 802.11 MAC WLAN processing unit. Operation proceeds from step 1312 to step 1314.

Figure 9:
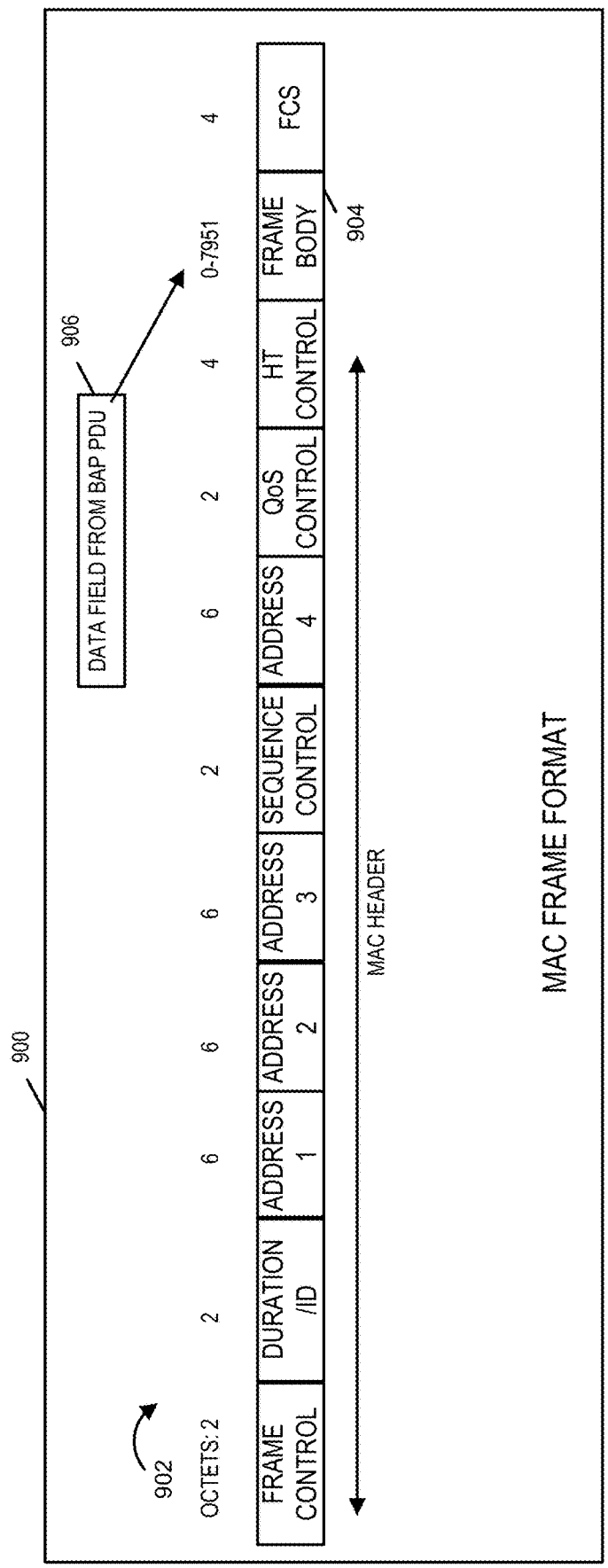
FIG. 9 illustrates a WLAN Media Access Control (MAC) frame format and the placement of the data from the data field of a Backhaul Adaptation Protocol PDU into the Frame Body of the MAC frame in accordance with an exemplary embodiment of the present invention.

In step 1314, the MAC Layer Processing Unit, e.g., a WLAN MAC Layer Processing Unit, creates or generates a MAC frame that encapsulates the data from the higher layers, e.g., the data from the data field of the received BAP PDU. Diagram 900 of FIG. 9 shows how the MAC Layer processing unit creates a MAC frame 902 that encapsulates the data from the higher layer BAP PDU data field 906 in the frame body 904 of the MAC frame 902. In this example, as wireless base station 2 1104 is the BAP PDU backhaul destination only the data field is encapsulated as the end device to which the data from the BAP PDU is to be sent is a WLAN user equipment device or station (e.g., STA 1108) coupled to the wireless base station 2 1104 via wireless access link 1120. The wireless access link 1120 is a RAT 2 WLAN link as shown and described in connection with system 1100 of FIG. 11. Operation proceeds from step 1314 to 1316.

In step 1316, the MAC Layer processing unit, e.g., WLAN MAC Layer processing unit, passes the MAC frame to a Physical Layer processing unit. Operation proceeds from step 1316 to step 1318.

In step 1318, the physical layer processing unit generates a physical layer message from the MAC frame. Operation proceeds from step 1318 to step 1320.

In step 1320, the generated Physical Layer message is transmitted to a destination WLAN UE or STA (e.g., WLAN STA 1108) over a WLAN wireless access link (e.g., RAT 2 wireless access link 1120).

Returning to step decision step 1308, as previously discussed when the determination in the decision step 1308 is that that the current device, e.g., wireless base station 2 1104, is not the received BAP PDU destination, processing proceeds from decision step 1308 to step 1322. This occurs for example, when the BAP PDU destination address is the address of wireless base station 3 1180 of system 1800 of FIG. 17 when the data being transmitted is data for the UE 1182.

In step 1322, the BOAP entity retains the BAP PDU header so that the BAP or BOAP entity at the next hop can correctly process the PDU. Operation proceeds from step 1322 to step 1324.

In step 1324, the BOAP entity, determines whether to use a RAT 1 backhaul wireless link (e.g., backhaul link 1184 of system 1800) or RAT 2 backhaul wireless link (e.g., backhaul link 1186 of system 1800) to transmit the BAP PDU to the next Hop destination (e.g., wireless base station 1180 of system 1800). The determination may be, and in some embodiments is based on Physical Layer-1 measurements and reports such as RSSI, and/or higher-layer measurements and/or reports based on flow quality and flow delay. While in this example, only one backhaul wireless link is to be used, in some embodiments, the wireless base station 2 may determine to split the data sending a first portion or percentage of the data over the RAT 1 backhaul wireless link and the rest over the RAT 2 backhaul wireless link. When the determination in step 1324 is to use a RAT 1 New Radio wireless backhaul link, operation proceeds from sub-step 1326 of step 1324 to step 1330 shown on FIG. 13B via connection node A 1328. When the determination in step 1324 is to use a RAT 2 802.11 wireless backhaul link, operation proceeds from sub-step 1340 of step 1324 via connection node B 1342 to step 1344 shown on FIG. 13B.

In step 1330, a physical New Radio message including the retained BAP PDU is generated by the RLC Layer processing unit, the MAC Layer processing unit, and the Physical Layer processing unit with the Physical Layer processing unit transmitting the BAP PDU to the next hop destination using RAT 1 New Radio wireless backhaul link.

In step 1344, the BOAP entity encapsulates the retained BAP PDU including the headers placing it in a 802.11 MAC frame body.

Figure 10:
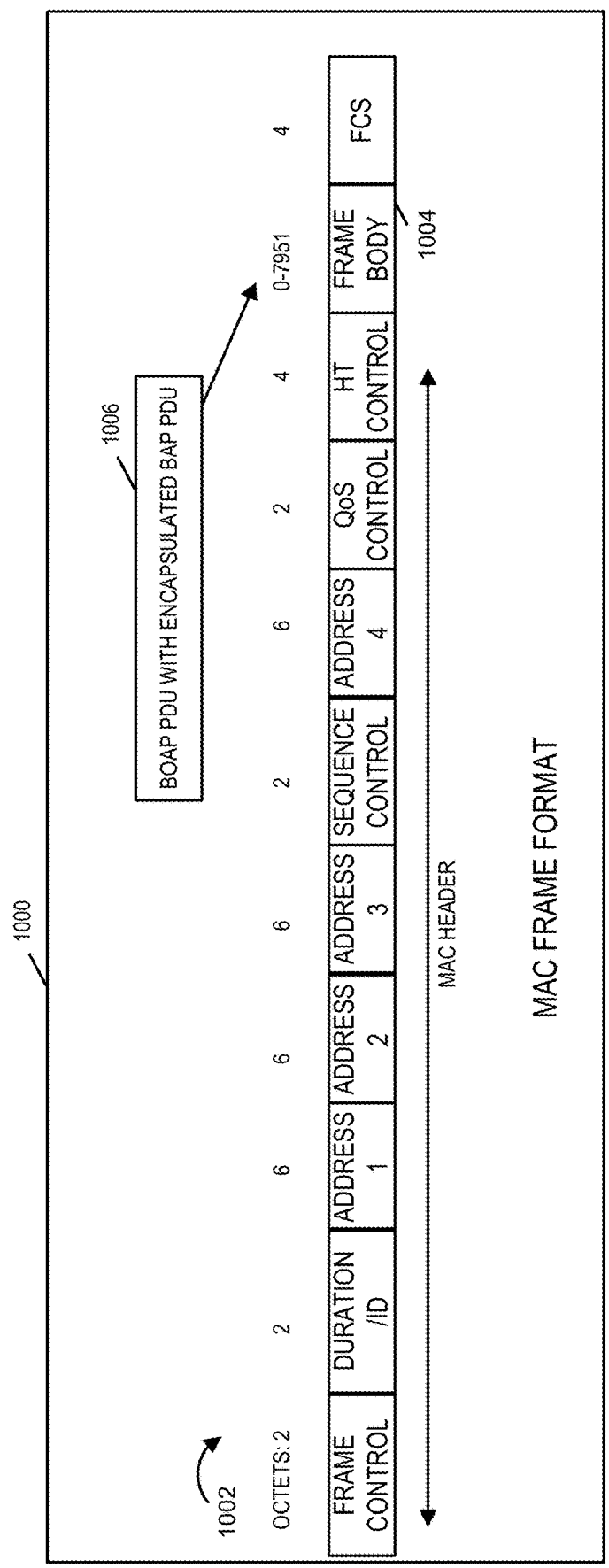
FIG. 10 illustrates a WLAN Media Access Control (MAC) frame format and the placement of a Backhaul Offload Adaptation Protocol PDU or packet into the Frame Body of the MAC frame in accordance with an exemplary embodiment of the present invention.

In step 1344, the BOAP entity encapsulates the retained BAP PDU, e.g., in a BOAP PDU, placing it in a 802.11 MAC frame body of a MAC frame. Operation proceeds from step 1344 to step 1346. In step 1346, a MAC layer processing unit, e.g., a 802.11 MAC Layer processing unit for the RAT 2 protocol, generates MAC header of MAC frame passes it to the physical layer processing unit. Diagram 1000 of FIG. 10 illustrates a BOAP PDU or packet 1006 including an encapsulated BAP PDU being placed in the frame body 1004 of a MAC frame 1002. In some embodiments, the BAP PDU or packet 1006 has the structure of BOAP packet 650 shown in FIG. 6 which includes a BOAP header field 652 and a BOAP data field 654, the BOAP data field 654 including the BAP Data PDU. In most embodiments, the encapsulated BAP Data PDU has the structure of the BAP Data PDU shown in diagram 600 of FIG. 6. Operation proceeds from step 1346 to step 1348.

In step 1348, the Physical Layer processing unit transmits the message with retained BAP PDU, e.g., encapsulated in a BOAP PDU, placed in the MAC frame body to the next hop destination over the RAT 2 802.11 wireless backhaul link.

The BAP layer processing unit may be, and in some embodiments is, a processor or processing circuitry that performs processing operations on a BAP message or BAP PDU. The RLC Layer processing unit may be, and in some embodiments is, a processor or processing circuitry that performs processing operations on a message RLC layer. The MAC Layer processing unit may be, and in some embodiments is, a processor or processing circuitry that performs processing operations on a message MAC layer. The Physical Layer processing unit may be, and in some embodiments is, a processor or processing circuitry that performs processing operations on a message physical layer. A BOAP layer processing unit may be, and in some embodiments is, a processor or processing circuitry that performs processing operations on BOAP PDU and BAP PDUs. A BOAP entity such as a wireless base station, e.g., wireless base station 1 1102 and 2 1104, typically includes a BOAP Layer processing unit. In some embodiments, a BOAP PDU includes a header and a body. The header of BOAP Protocol Data Unit including a filed identifying it as a BOAP protocol data unit and the body of the including the encapsulated BAP PDU. In some embodiments, the BOAP PDU header also includes a length field identifying the length of the BOAP PDU.

In the event that RAT 2 is a non-3GPP access such as WLAN or WiGig, the route selection at the BAP sublayer may be based on Layer-1 measurements and reports such as RSSI, and/or higher-layer measurements and reports based on flow quality and flow delay, such as defined in the Release 16 and Release 17 access traffic steering, switch and splitting support (ATSSS) feature. The 3rd Generation Partnership Project; Technical Specification Group Services and System Aspects; Study on Access Traffic Steering, Switching and Splitting support in the 5G system architecture (Release 16) 3GPP TR 23.793 V.0.7.0 dated August 2018 is incorporated herein by reference in its entirety.

Figure 14:
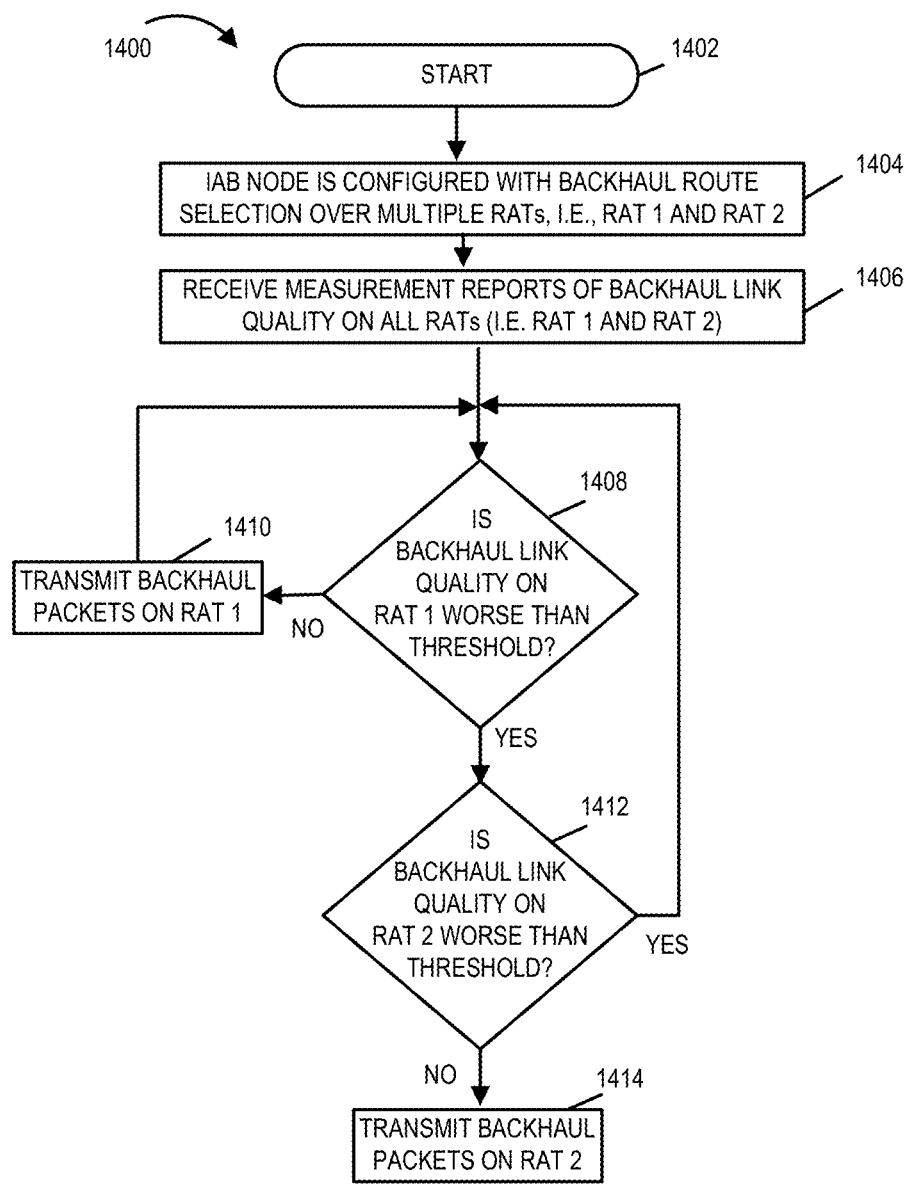
FIG. 14 illustrates the steps of another exemplary method in accordance with an embodiment of the present invention.

If a backhaul link on RAT 1 is in a Radio Link Failure condition, the wireless base station, e.g., IAB node, implementing the BAP protocol switches to the backhaul link on the RAT 2 link (if available) and vice versa. A non-limiting example decision flow for backhaul route selection is illustrated by the method 1400 illustrated in the flowchart shown in FIG. 14. It provides an example of traffic steering as applied to multi-RAT backhaul system.

The method 1400 commences in start step 1402. Operation proceeds from step 1402 to step 1404.

In step 1404, an IAB node is configured with backhaul route selection over multiple RATs, e.g., wireless base station 1 1102 of FIG. 11 configured to select a backhaul route over RAT 1 wireless backhaul link 1112 and RAT 2 wireless backhaul link 1114. Operation proceeds from step 1404 to step 1406.

In step 1406, IAB node, e.g., wireless base station 1 1102, receives measurement reports of backhaul link quality on all RATs (i.e., RAT 1 wireless backhaul link 1112 which is a 5G New Radio wireless backhaul link and RAT 2 wireless backhaul link 1114 which is a non-3GPP RAT, e.g., WLAN or WiGig). Operation proceeds from step 1406 to decision step 1408.

In decision step 108, the IAB node determines if backhaul link quality on RAT 1 is worse than a first threshold value. The first threshold value may be, and in some embodiments, indicates a failure condition for the link. When the determination in step 1408 is no, then operation proceeds from step 1408 to step 1410. In step 1410, the IAB node transmits backhaul packets on the RAT 1 wireless backhaul link. When the determination in step 1408 is yes, then operation proceeds from decision step 1408 to decision step 1412.

In decision step 1412, the IAB node determines whether the backhaul link quality on RAT 2 is worse than a second threshold value. The second threshold value may be, and in some embodiments, indicates a failure condition for the link. When the decision in step 1412 is yes for example indicating a failure of the link then processing proceeds from step 1412 to step 1408 where the backhaul quality of the RAT 1 link is again determined and compared to the first threshold value to determine whether RAT 1 link is for example no longer worse than the first threshold, e.g., no longer in a failure condition and can be used to transmit the backhaul packets on the RAT 1 link.

When the decision in step 1412 is no, then the IAB node transmits backhaul packets on the RAT 2 link.

In some embodiments, the decision steps 1408 and 1414 are replaced with a single decision to determine which of the all the RAT links has the highest quality followed by transmitting the backhaul packets on the determined RAT link with the highest quality. In such embodiments, the congestion on the RAT link is considered as a quality factor. In another embodiment, the IAB node determines the RAT links with a quality value greater than a threshold value and apportions the backhaul packets to be transmitted across all RAT links determined to have a quality value greater than the threshold value.

Figure 1:
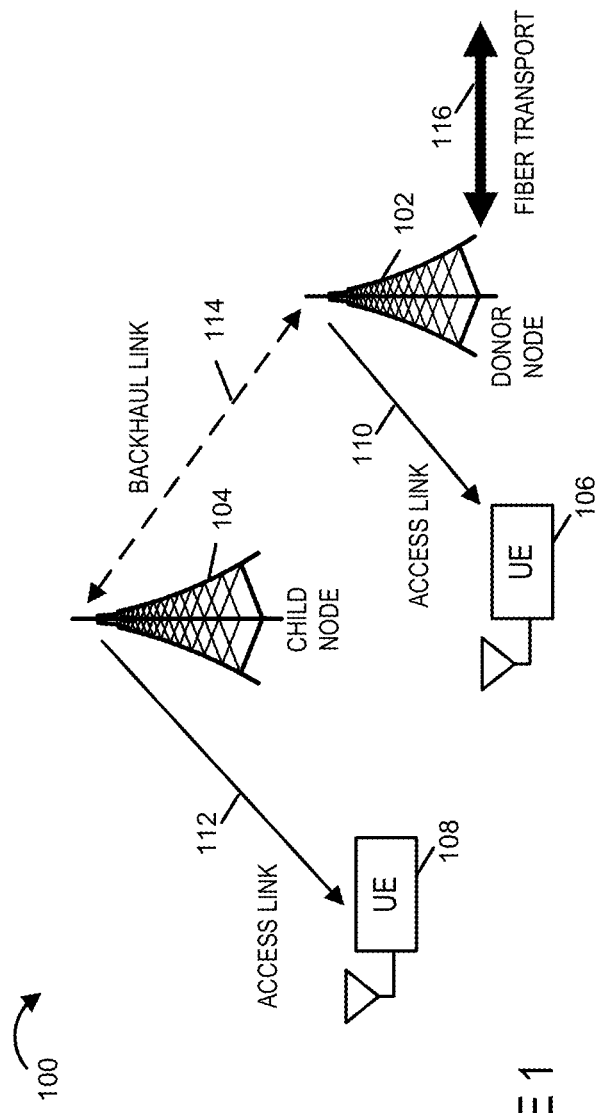
FIG. 1 illustrates an exemplary one-hop Integrated Access and Backhaul wireless communications network.
Figure 2:
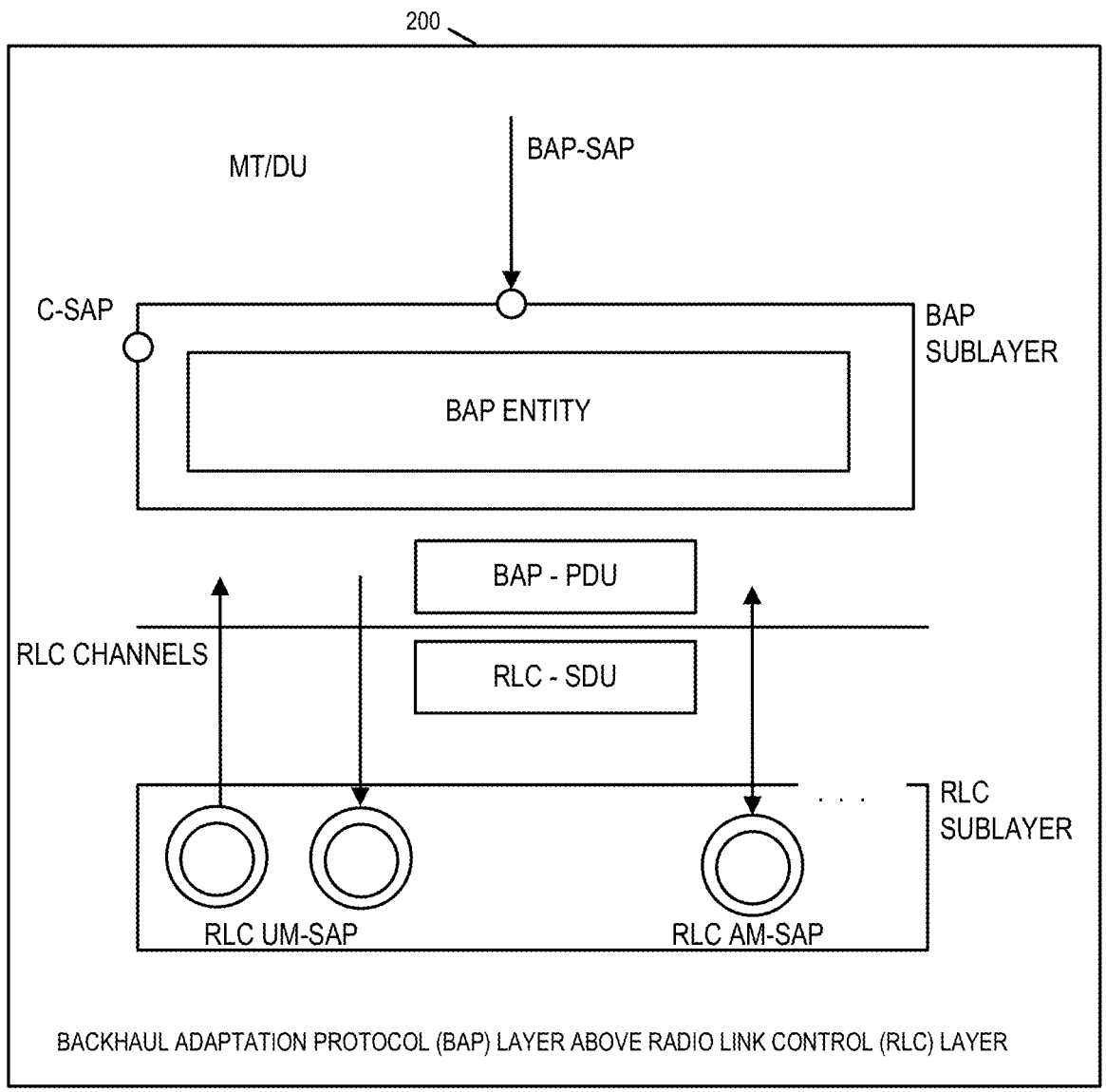
FIG. 2 illustrates the structure of the Backhaul Adaptation Protocol (BAP) layer and its position above the Radio Link Control Layer
Figure 3:
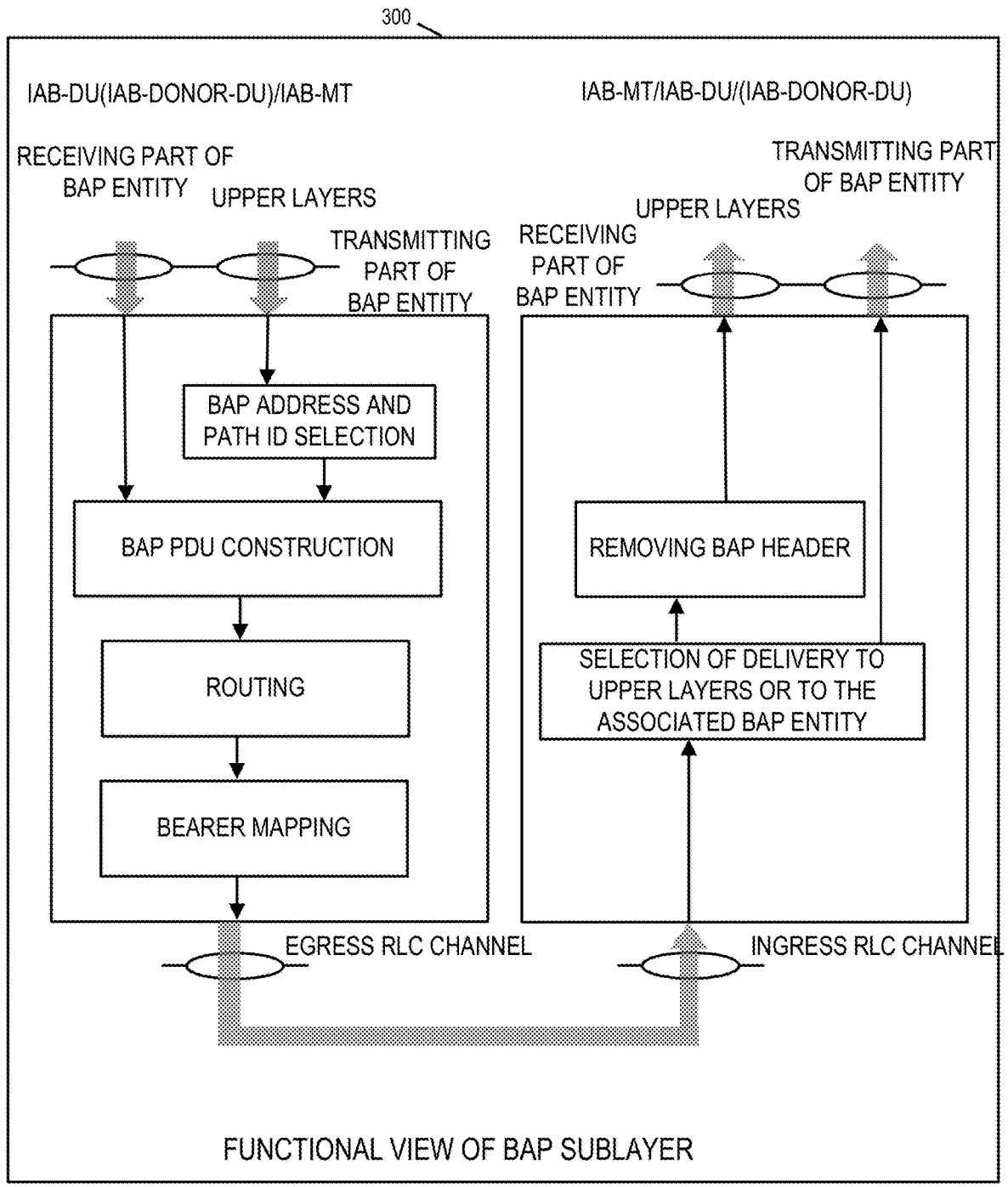
FIG. 3 illustrates a functional view of the Backhaul Adaptation Protocol sub-layer.
Figure 4:
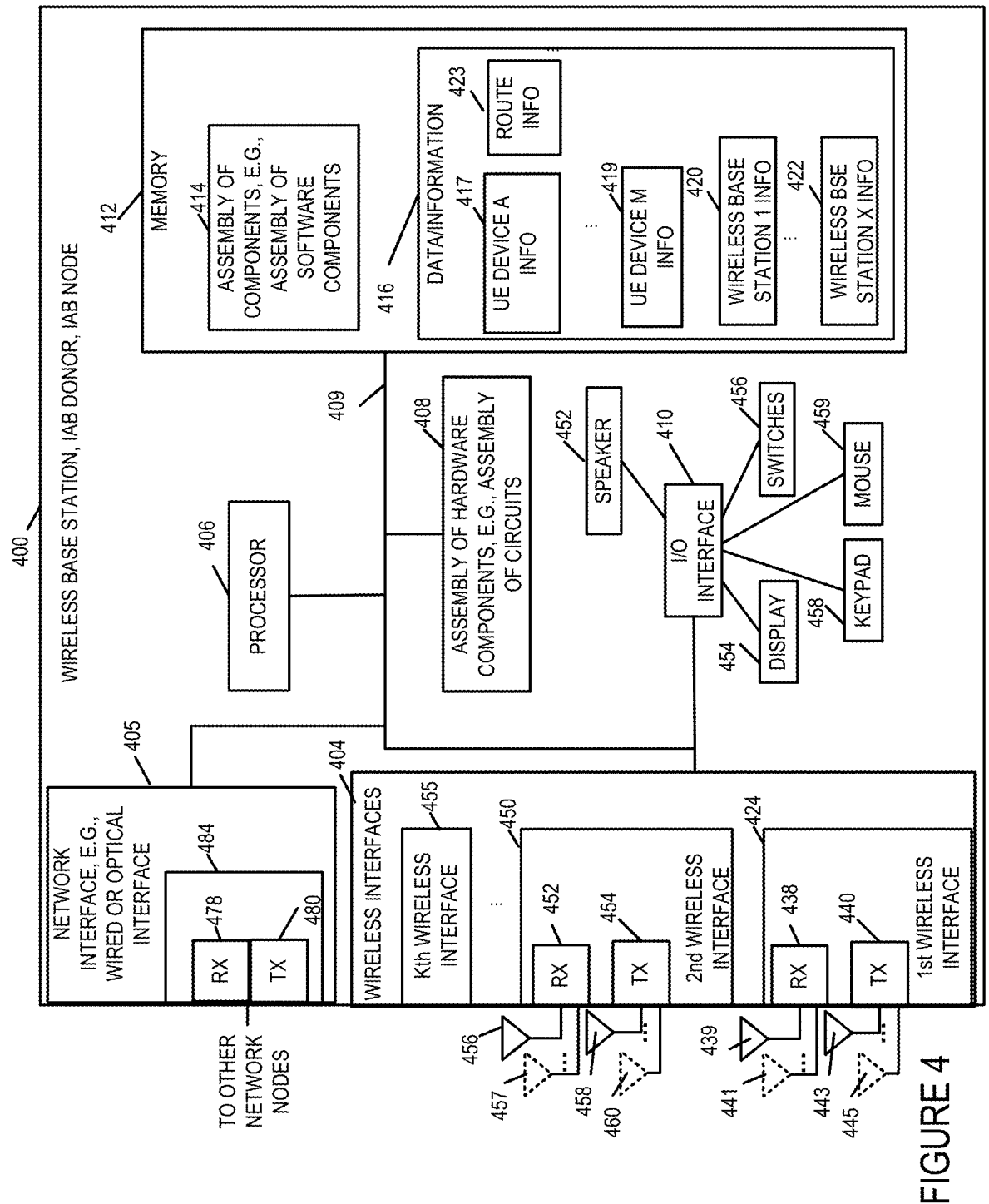
FIG. 4 illustrates details of an exemplary wireless communications node, e.g., wireless base station, Integrated Access and Backhaul (IAB) donor, IAB node, in accordance with one embodiment of the present invention.

FIG. 4 is a drawing of an exemplary wireless base station 400, which may be implemented as an IAB donor or an IAB node, in accordance with an exemplary embodiment. Exemplary wireless base station 400, e.g., IAB donor or IAB node 400, includes a wireless interface 404, a network interface 405, e.g., a wired or optical interface when the wireless base station is an IAB donor, a processor 406, e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interfaces 404 include a plurality of wireless interfaces including first wireless interface 424, second wireless interface 450, . . . , Kth wireless interface 455. In some embodiments, each wireless interface implements a different Radio Access Technology with at least one wireless interface implementing 5G New Radio radio access technology. The wireless interfaces are used to communicate with the UE devices, mobile terminals, and other wireless base stations, IAB donor or IAB nodes. The first wireless interface 424 is for example a 5G New Radio RAT wireless interface used to Integrated Access and Backhaul and is used to communicate with User Equipment devices and other wireless base stations, IAB donor or IAB nodes. In some embodiments, the second and some of the additional wireless interface is a non-3GPP Radio Access Technology interface, e.g., 802.11 ad radio access technology, 802.11 ay radio access technology, 802.11 ac radio access technology, or 802.11 ax radio access technology, a Wi-Fi or WiGig radio access technology. In some embodiments, there a plurality of wireless interfaces for each type of Radio Access Technology. In some embodiments, the wireless base station, IAB donor or IAB node only has the capability to support one type of radio access technology which is the 5G New Radio radio access technology. Devices which have multi-RAT interfaces are multi-RAT devices. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a user equipment device or another wireless base station, IAB donor, or IAB node. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., user equipment device or another wireless base station, IAB donor, or IAB node.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which wireless base station 400 can receive wireless signals from other wireless communications devices including a second wireless communications device, e.g., another wireless base station, IAB donor, IAB node, mobile terminal, user equipment device, STA wireless device, using the same or a different wireless protocol than the first wireless interface. Wireless transmitter 454 is coupled to one or more wireless transmit antennas (transmit antenna 1 458, . . . , transmit antenna N 460) via which the wireless base station 400 can transmit signals to other wireless communications devices including a second wireless communications device. The wireless base station network interface 405 may be coupled, other networks, e.g., core network, internet, or other wireless base stations. When the wireless base station is a IAB donor it is coupled to another network, e.g., core network, via a wire or fiber optic transport cable. In some embodiments, wireless base station does not include the network interface 405. IAB nodes, e.g., or wireless base station which are IAB nodes typically do not include network interface 405 and are not connected to a core network via a wire or fiber optic cable. In various embodiments, each wireless interfaces includes one or more processors or processing circuitry, e.g., BAP layer processing entity or unit, BOAP layer processing unit, RLC layer processing unit, MAC layer processing unit, physical layer processing unit, for performing processing required in connection with receiving and transmitting messages for example using a particular radio access technology.

Memory 412 includes an assembly of components 414, e.g., an assembly of software components, and data/information 416. Data/information 416 includes UE device information corresponding to a plurality of user equipment devices (UE device A information 417, . . . , UE device M information 419 where A to M are the UE devices or STA devices being serviced by the wireless base station, wireless base station, IAB donor, IAB node information (wireless base station 1 information 420, . . . , wireless base station X information 422), and routing information 423. While the details of the first and second wireless interfaces are shown, the other wireless interfaces of the wireless base station, e.g., wireless interface K where K is an integer greater than 2 also include multiple receivers and transmitters so that the wireless base station 400 can provide wireless services to a plurality of other wireless base stations and thousands of user equipment devices. The wireless base station/IAB donor/IAB node information includes device profile record(s), information on the RATs supported by the device (e.g., RAT availability, capability, and performance statistics). In some embodiments, one or more of the wireless base stations/IAB donors/IAB nodes discussed and/or shown in the FIGS. 11 and 15, and/or in connection with the methods discussed herein including wireless base stations/IAB donors/IAB nodes 1102, 1104, 1502, 1504, 1506, 1508 are implemented in accordance with the wireless base station/IAB donor/IAB node 400. The routing information 423 includes the path identity and information about the paths and routes, e.g., wireless backhaul RAT routes between base station and nodes, and the wireless base station and nodes along the routes, multi-RAT availability, multi-RAT capability and RAT performance metrics on the wireless links.

Figure 5:
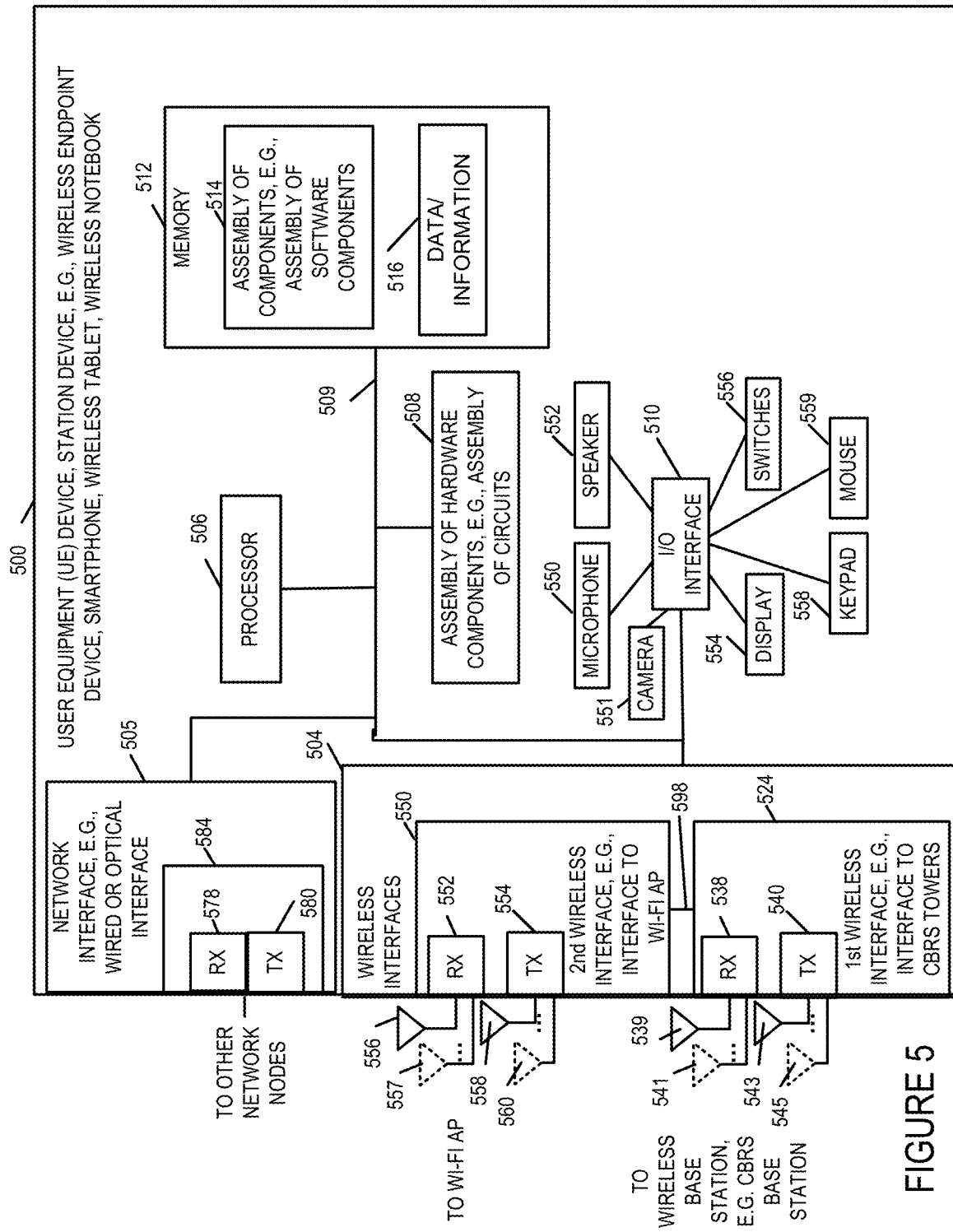
FIG. 5 illustrates details of an exemplary User Equipment (UE) device/station terminal, in accordance with one embodiment of the present invention.

FIG. 5 is a drawing of an exemplary user equipment (UE) device 500 in accordance with an exemplary embodiment. UE device 500 is, e.g., a computer, a mobile device such as a a smart phone, wireless tablet or wireless notebook, a smartTV, internet cable box, internet enabled device. UE device 500 includes Radio Access Technology device capabilities for at least one Radio Access Technology, e.g., 5G New Radio radio access technology or a non-3GPP RAT such as for example WiGig or 802.11 ad radio access technology, 802.11 ay radio access technology, 802.11 ac radio access technology, or 802.11 ax radio access technology so that the UE can wireless communication with a wireless base station, IAB node or IAB donor. UE device 500 is also optionally enabled to communicate more than one wireless protocol or RAT. Exemplary UE device 500 includes wireless interfaces 504, a network interface 505, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. The network interface 505 can be coupled to routers within the home or customer premises or to wired (e.g., cable) or optical (e.g., fiber-optic) networks. In some embodiments, receiver 578 and transmitter 580 are part of a transceiver 584.

Wireless interfaces 504 include a plurality of wireless interfaces including first wireless interface 524 and a second wireless interface 550. The first wireless interface 524 is used to communicate with the wireless base station, e.g., 5G New Radio RAT wireless base station or IAB donor or IAB node. The second wireless interface is used to communicate with a Wi-Fi Access Point or another wireless base station that supports a different wireless RAT when the first and second wireless interfaces support different RAT. The first wireless interface 524 includes wireless receiver 538 and a wireless transmitter 540. In some embodiments, receiver 538 and transmitter 540 are part of a transceiver. In various embodiments, the first wireless interface 524 includes a plurality of wireless receivers and a plurality of wireless transmitters. Wireless receiver 538 is coupled to a plurality of receive antennas (receive antenna 1 539, . . . , receive antenna M 541), via which user equipment device 500 can receive wireless signals from other wireless communications devices including a wireless base station, e.g., wireless base station 1528 when the UE is UE 1410. Wireless transmitter 540 is coupled to a plurality of wireless transmit antennas (transmit antenna 1 543, . . . , transmit antenna N 545) via which the user equipment device 500 can transmit signals to other wireless communications devices including a second wireless communications device, e.g., another wireless base station. In some embodiments the various antennas form an antenna array with the antennas pointing in different directions. In some embodiments, one or more of the antennas are included inside the housing of the user equipment device and the user equipment device may include one or more connections to which exterior antennas may be connected for example when the wireless device is a fixed wireless device.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, . . . , receive antenna M 557), via which user device 500 can receive wireless signals from other wireless communications devices including a second wireless communications device, e.g., a Wi-Fi Access Point using Wi-Fi protocol or another wireless base station using a different RAT protocol than the first wireless interface. Wireless transmitter 554 is coupled to one or more wireless transmit antennas (transmit antenna 1 558, . . . , transmit antenna N 560) via which the user equipment device 500 can transmit signals to other wireless communications devices including a second wireless communications device. The user equipment device network interface 505 may be coupled to LAN or WAN networks or routers so that the user equipment device can also obtain services via a hardwired connection in addition to through the wireless interfaces. In the exemplary embodiment the second wireless interface is a non-3GPP RAT wireless interface and may be and in some embodiments is a Wi-Fi wireless interface or a WiGig wireless interface.

Memory 512 includes an assembly of components 514, e.g., an assembly of software components, and data/information 516.

In some embodiments, one or more of the user equipment devices shown in the figures or discussed herein for example in connection with the methods described including for example UE devices UE 1510, STA 1512, UE 1514, UE 1550, UE 1106, STA 1108, UE 1110 are implemented in accordance with exemplary user equipment device 500. While the UE device 500 has been illustrated as a dual mode device that has two wireless interfaces 550 and 524, the UE device 500 may, and in some embodiments, is not a dual mode device but instead is a single mode operation device with a single wireless interface either wireless interface 1 524 which is enable to communicate with a wireless base station using a first wireless RAT protocol, e.g., a 5G New Radio RAT, 802.11 ad RAT, 802.11 ay RAT, 802.11 ac RAT, 802.11 ax RAT wireless protocol, or wireless interface 2 550 which is a Wi-Fi interface which is enabled to communicate with a Wi-Fi Access Point or router or one of the previously mentioned protocols.

Figure 7:
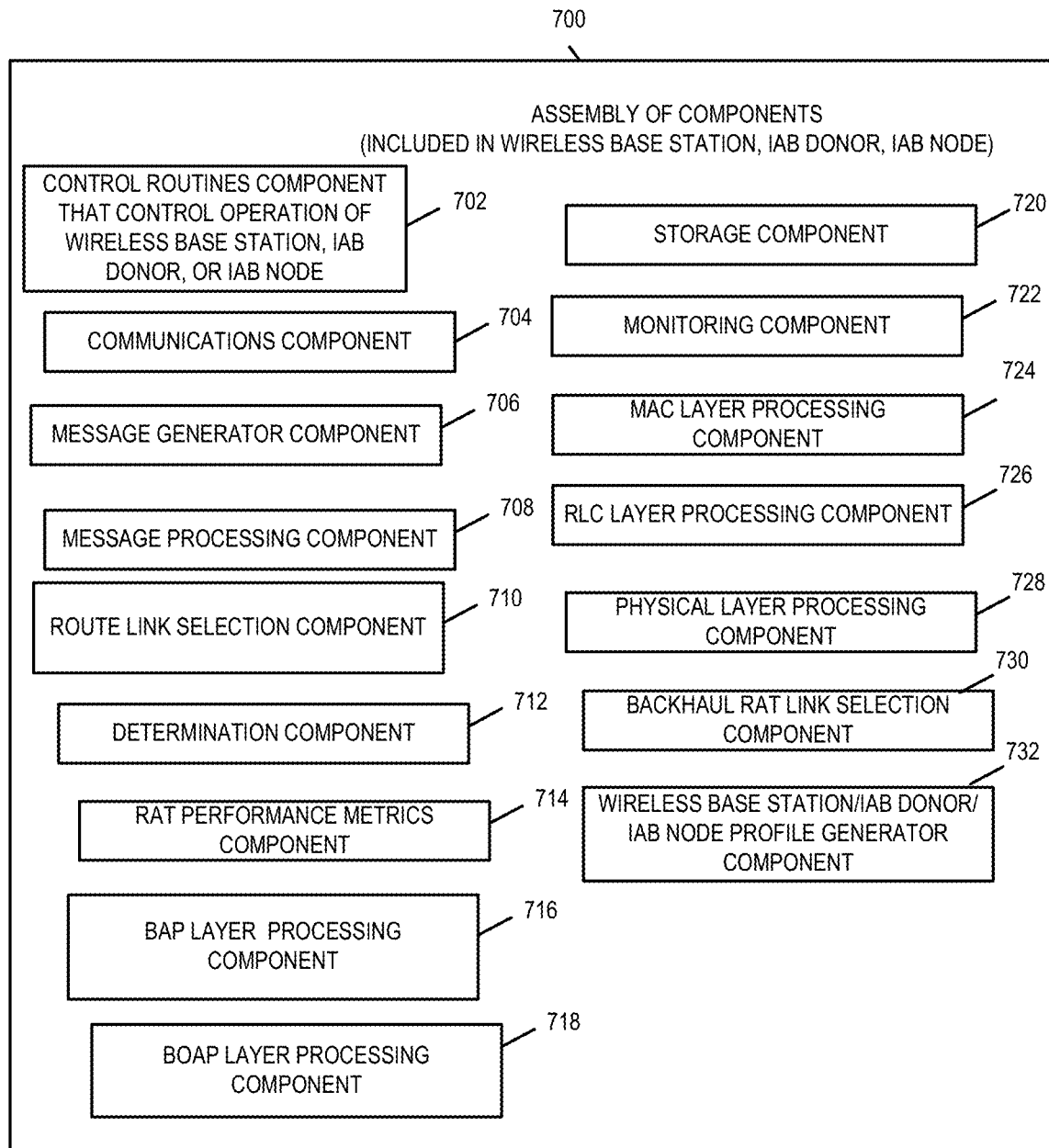
FIG. 7 illustrates an exemplary assembly of components for a wireless base station, IAB donor, IAB node in accordance with an embodiment of the present invention.

FIG. 7 is a drawing of an exemplary assembly of components 700 which may be included in a wireless base station, e.g., exemplary wireless base station 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station device 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions or operations corresponding to one or more described and/or illustrated steps of an exemplary method.

Assembly of components 700 includes a control routines component 702, a communications component 704, a message generator component 706, a message processing component 708, route selection component 710, a determination component 712, an RAT performance metrics component 714, a BAP-PDU Processing component 716, a BOAP packet processing component 718, a storage component 720, a monitoring component 722, MAC Layer processing component 724, RLC Layer processing component 726, Physical Layer processing component 728, a backhaul RAT link selection component 730, a wireless base station, IAB donor, IAB node profile generator component 732.

The control routines component 702 is configured to control operation of the wireless base station/IAB donor/IAB node. The communications component 704 is configured to handle communications, e.g., transmission and reception of messages, and protocol signaling for the wireless base station/IAB donor/IAB node. The message generator component 706 is configured to generate messages for transmission to other devices. The message processing component 708 is configured to process received messages and is sometimes a sub-component of communications component 704. The message processing component 708 generates BAP-PDU and performs BAP layer/entity processing. The message processing component 708 also generates BOAP packets and performs BOAP layer/entity processing. The determination component 712 makes various determinations for the wireless base station/IAB donor/IAB node including for example, determining the selection of routes, determining the selection of portion of data to be sent over different routes, determining the selection of backhaul RAT wireless communications links to use, determining the portion of data, BAP-PDUs and/or BOAP packets to communicate over a backhaul RAT link, determining if threshold have been meet or exceeded, determining performance metrics for Radio Access Technology employed at a wireless base station, IAB donor, or IAB node, determining when the wireless base station/IAB donor/IAB node is a received BAP-PDU destination, determining path identifier for a route, determining a set of routes between an originating wireless base station and a destination wireless base station, and determine link status and failures.

The RAT performance metrics component 714 is configured to measure the performance of metrics for Radio Access Technologies employed on backhaul communications links and at the wireless base station/IAB donor/IAB node as well as Received Signal Strength Indicator (RSSI) and other signals for different RATs and track history of the performance metrics of the Radio Access Technologies employed over a time period.

The BAP layer processing component 716 is configured to perform all BAP layer processing including generating BAP-PDUs. In some embodiments, the BAP layer processing component 716 is a sub-component of the communications component 704.

The BOAP layer processing component 718 is configured to perform all BOAP layer processing including generating BOAP packets, encapsulating and decapsulating BAP-PDUs, inserting BAP-PDUs in MAC frame bodies and generating MAC address based on routing/backhaul link selection information. In some embodiments, the BAP layer processing component 718 is a sub-component of the communications component 704.

The storage component 720 controls the storage and retrieval of information and data in the memory and buffers of the wireless base station/IAB donor/IAB node.

The monitoring component 722 monitors RAT link status, availability and performance at a wireless base station/IAB donor/IAB node.

The MAC layer processing component 724 is configured to perform MAC layer processing for one or more types of radio access technology protocols, e.g., 5G New Radio RAT, Wi-Fi RAT, WiGig RAT, including generating MAC frames and processing of received MAC frames. In some embodiments, the MAC layer processing component 724 is a sub-component of the communications component 704.

The Radio Link Control (RLC) layer processing component 726 is configured to perform RLC layer processing for one or more types of radio access technologies, e.g., 5G New Radio RAT. In some embodiments, the RLC layer processing component 726 is a sub-component of the communications component 704.

The Physical layer processing component 728 is configured to perform physical layer 1 including the generation and transmission of signals and messages. In some embodiments, the Physical layer processing component 728 is a sub-component of the communications component 704.

The backhaul link selection component 730 is configured to select backhaul links for communication of data and the amount of data from a flow to be communicated using a particular selected link, e.g., number or percentage of BAP-PDU or BOAP packets of a flow to communicate over a selected link.

The wireless base station/IAB donor/IAB node profile generator component generates profiles for wireless base station/IAB donor/IAB nodes based on information obtained about each wireless base station/IAB donor/IAB node either through receiving information, e.g., RAT capabilities, availability, performance metrics, from the wireless base station/IAB donor/IAB node or through interactions with the wireless base station/IAB donor/IAB node, e.g., through monitoring of metrics when sending or receiving data from the wireless base station/IAB donor/IAB node.

It should be understood that not all wireless base stations, IAB donor/IAB nodes need to implement each of the components of the assembly of components 700 different devices may, and in some embodiments, implement different components.

Figure 8:
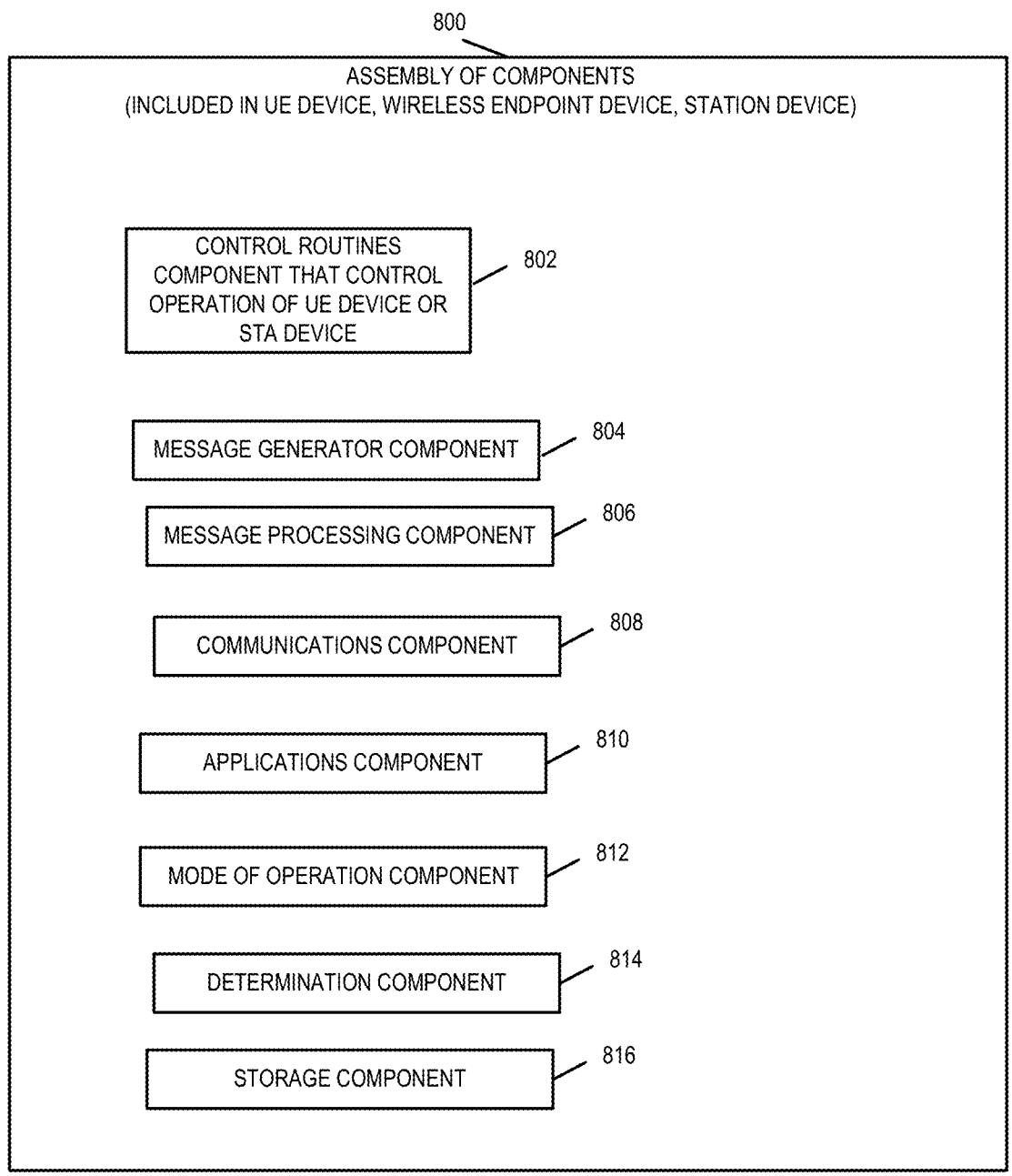
FIG. 8 illustrates an exemplary assembly of components for a user equipment device or terminal in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a message generator component 804, a message processing component 806, a communications component 808, an applications component 810, mode of operation component 812a determination component 814, and a storage component 816.

The control routines component 802 is configured to control operation of the UE or STA. The message generator component 804 is configured to generate messages for transmission to various devices including for example a wireless base station, Wi-Fi Access Point, an IAB donor, IAB node. The message processing component 806 is configured to process messages received from other devices, e.g., a wireless base station or a Wi-Fi Access Point. In some embodiments, the message processing component 806 is a sub-component of the communications component 808. The communications component 808 is configured to handle communications, e.g., receipt and transmission of signals and provide protocol signal processing for one or more protocols, e.g., RAT protocols for the UE. The applications component 810 is configured to provide various application services for the UE device, e.g., voice over internet protocol calling services, video on demand services, media download services, conferencing services, internet access and web browsing services, etc. The mode of operation component 812 is an optional component which is present in dual mode operation devices that operate using two different wireless RAT protocols. The dual mode of operation component 812 is configured to establish different transmission paths for receiving data packets using different wireless protocols (e.g., 5G NR wireless protocol and WiGig protocol) depending on the selection of the mode of operation. The determination component 814 is responsible for making determinations at the user equipment device including for example the selection of the mode of operation (e.g., 5G New Radio wireless protocol or WiGig protocol). The storage component 816 controls the storage and retrieval of information and data in the memory of user equipment device.

Figure 16A:
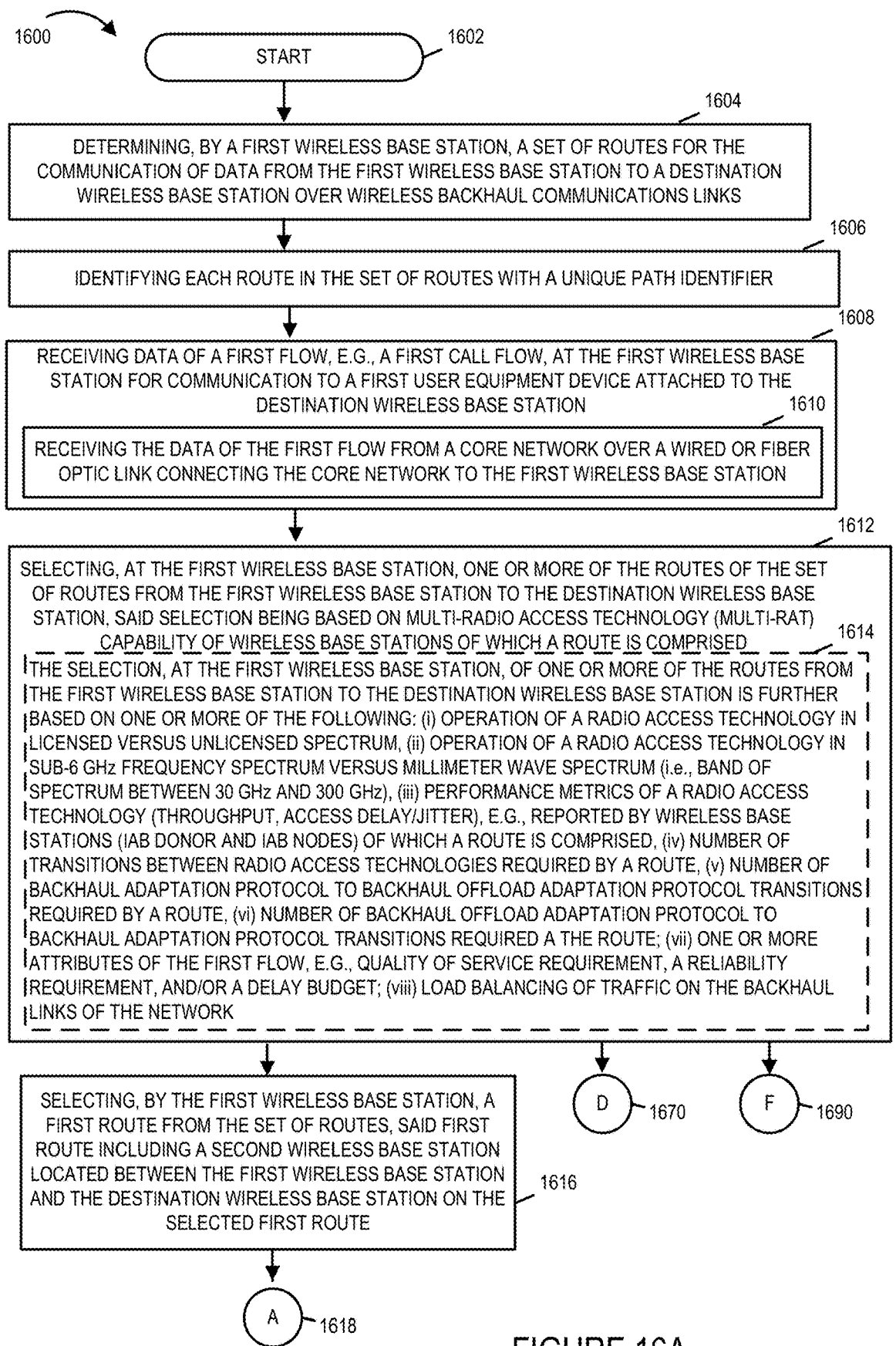
FIG. 16A illustrates the steps of the first part of an exemplary method in accordance with one embodiment of the present invention.
Figure 16B:
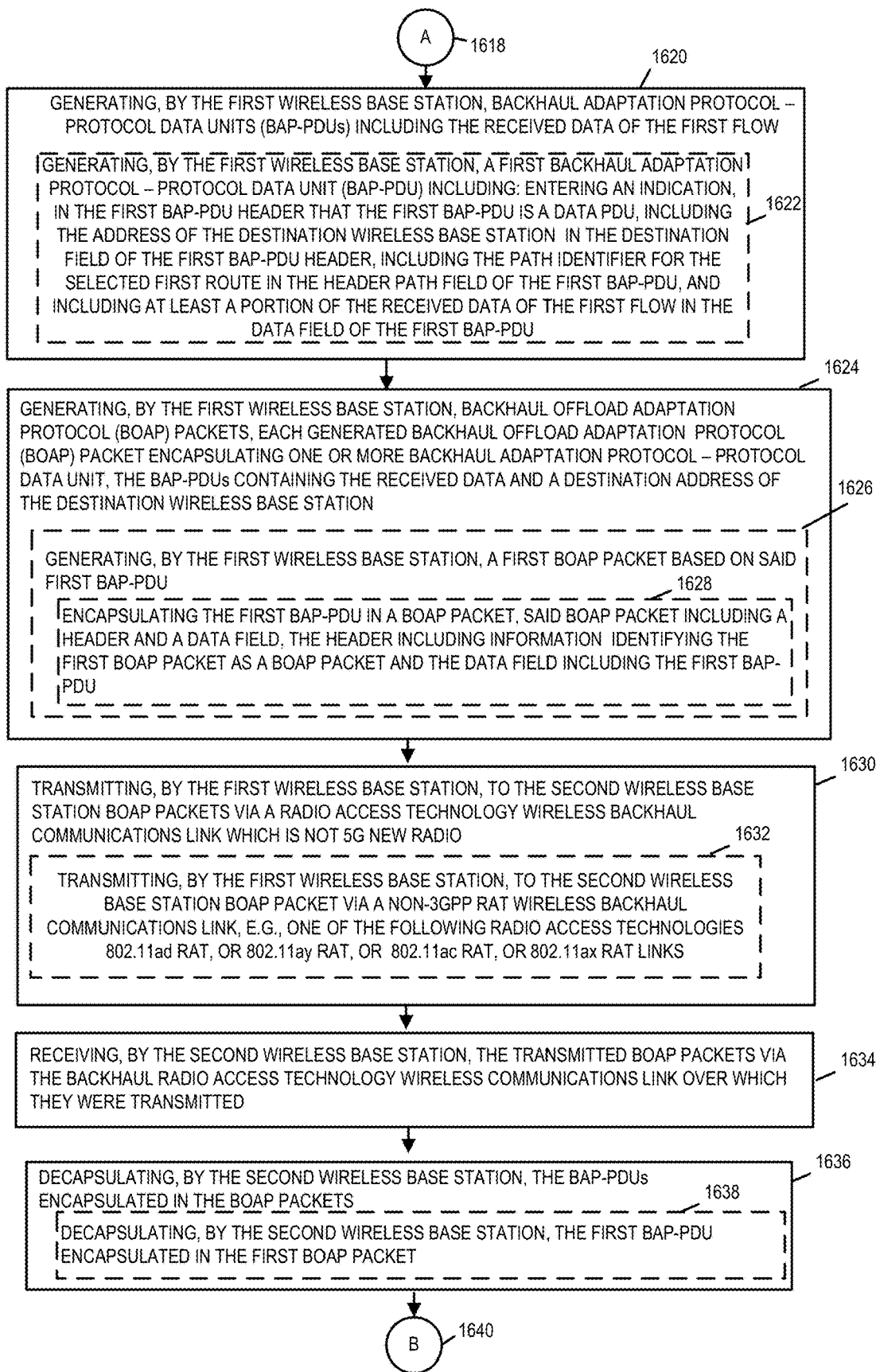
FIG. 16B illustrates the steps of the second part of an exemplary method in accordance with one embodiment of the present invention.
Figure 16C:
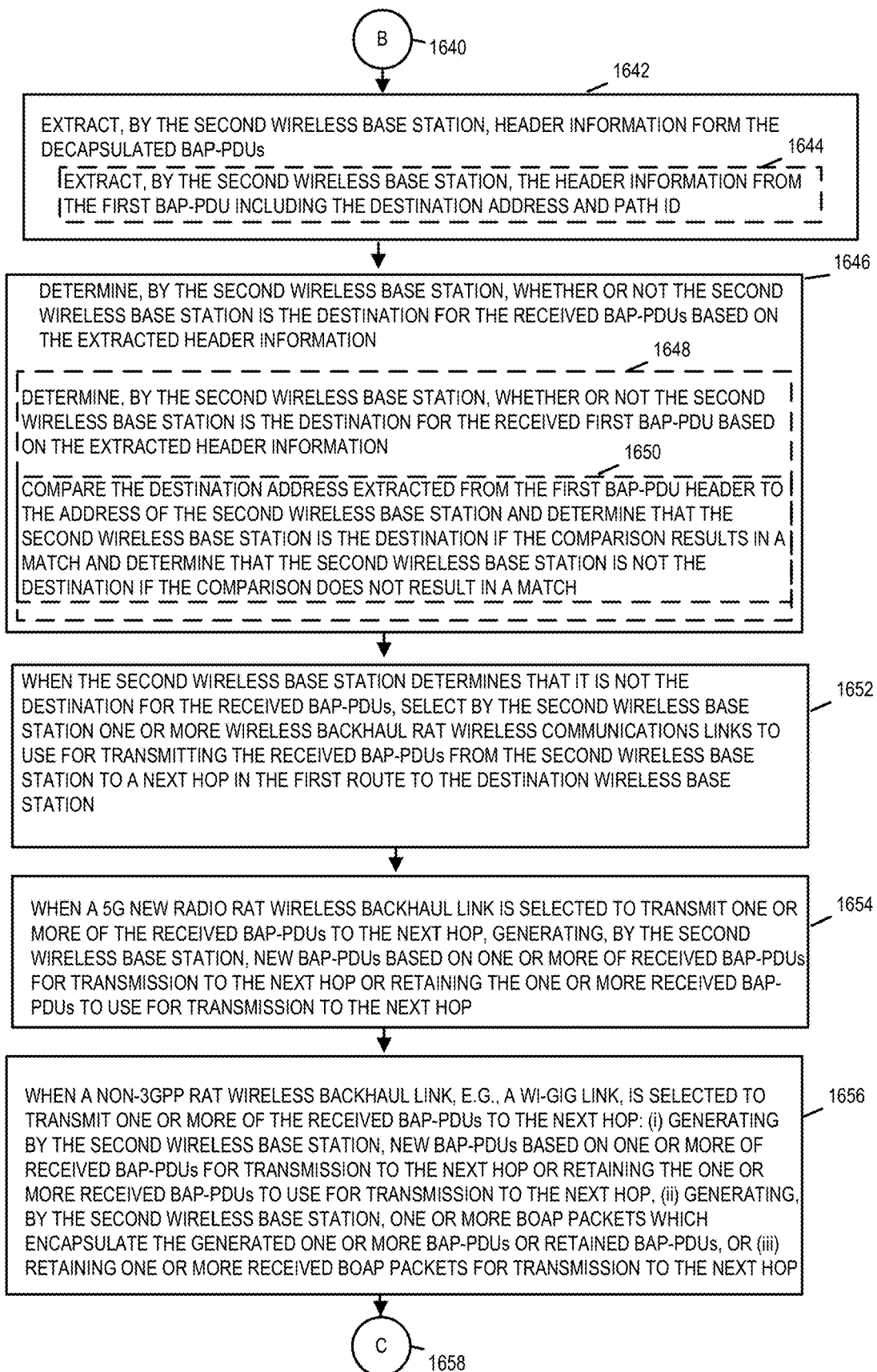
FIG. 16C illustrates the steps of the third part of an exemplary method in accordance with one embodiment of the present invention.
Figure 16D:
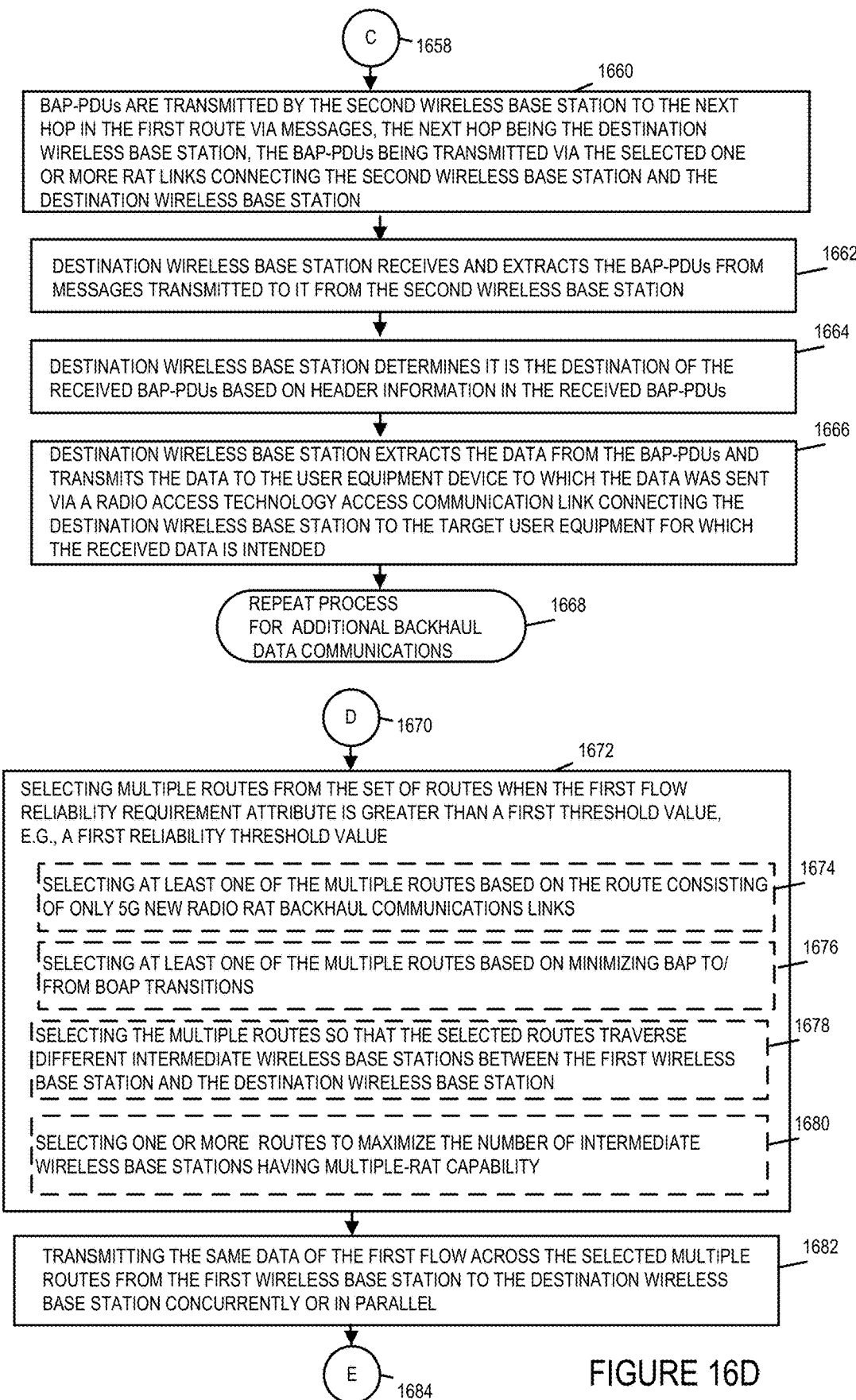
FIG. 16D illustrates the steps of the fourth part of an exemplary method in accordance with one embodiment of the present invention.
Figure 16E:
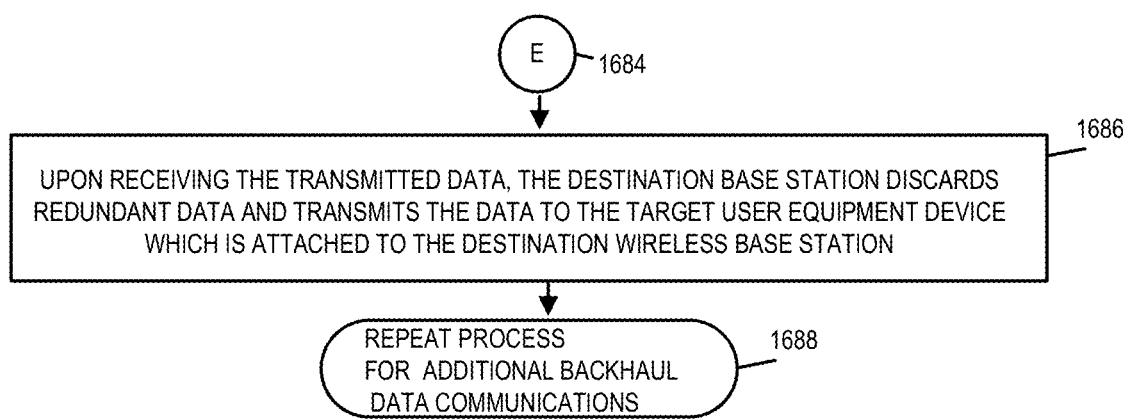
FIG. 16E illustrates the steps of the fifth part of an exemplary method in accordance with one embodiment of the present invention.
Figure 16F:
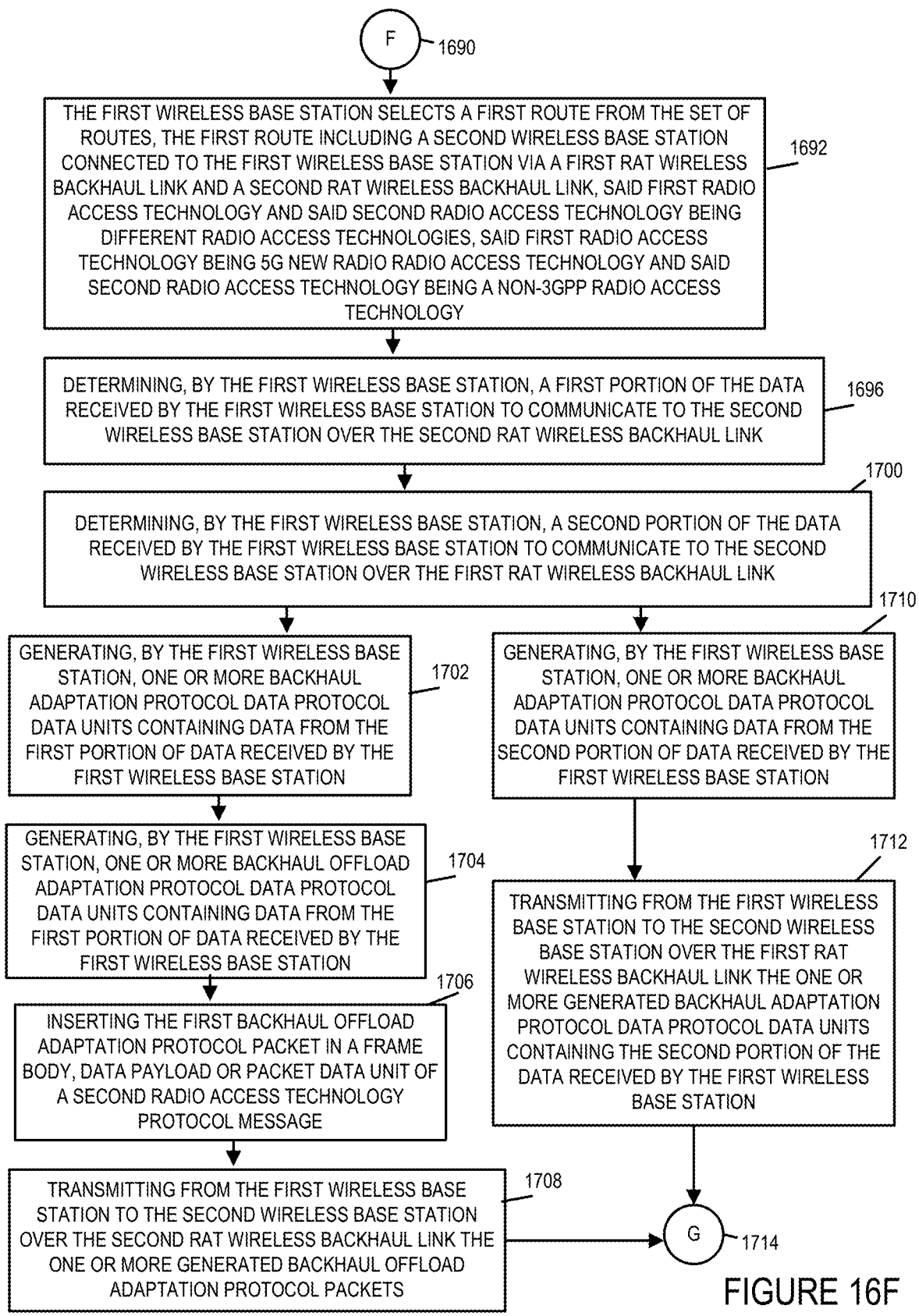
FIG. 16 illustrates the combination of FIGS. 16A, 16B, 16C, 16D, 16E, 16F, and 16G.
Figure 16G:
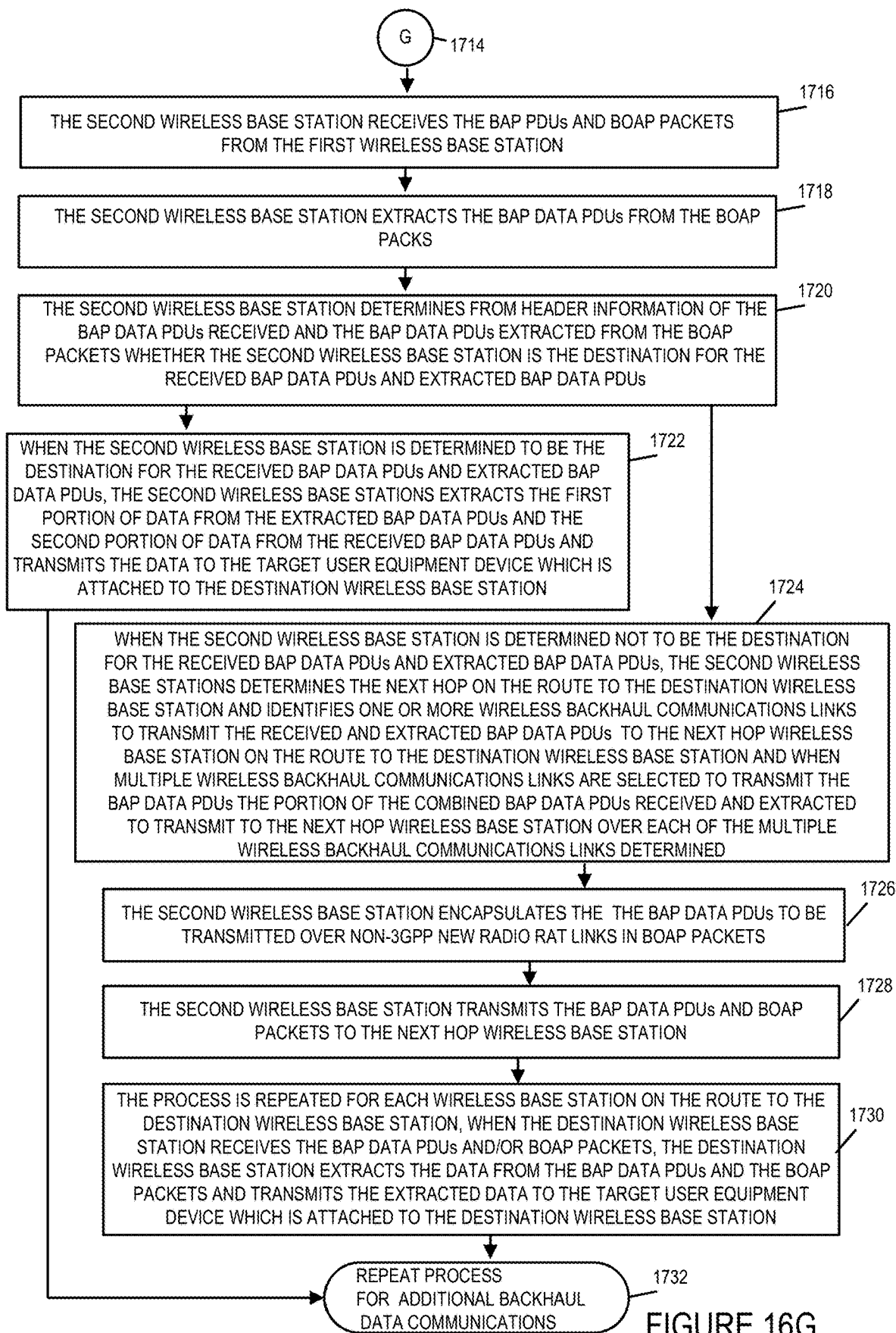

FIG. 16, which comprises the combination of FIGS. 16A, 16B, 16C, 16D, 16E, 16F and 16G illustrates an exemplary method 1600. FIG. 16A illustrates the steps of the first part of an exemplary method 1600 in accordance with one embodiment of the present invention. FIG. 16B illustrates the steps of the second part of an exemplary method 1600 in accordance with one embodiment of the present invention. FIG. 16C illustrates the steps of the third part of an exemplary method 1600 in accordance with one embodiment of the present invention. FIG. 16D illustrates the steps of the fourth part of an exemplary method 1600 in accordance with one embodiment of the present invention. FIG. 16E illustrates the steps of the fifth part of an exemplary method 1600 in accordance with one embodiment of the present invention. FIG. 16F illustrates the steps of the sixth part of an exemplary method 1600 in accordance with one embodiment of the present invention. FIG. 16G illustrates the steps of the seventh part of an exemplary method 1600 in accordance with one embodiment of the present invention.

For explanatory purposes the exemplary method 1600 will be explained in connection with the exemplary communications system 1500 illustrated in FIG. 15 although it should be understood that the method may be implemented using other systems and other system configurations then those illustrated in FIG. 15. While it will be readily understood that additional steps and signaling are performed in connection with communicating information, messages, protocol data units, and packets between devices, the method 1600 focuses on and discusses the steps and signaling for understanding the invention.

The method 1600 shown in FIG. 16 will now be discussed in detail. The method starts in start step 1602 shown on FIG. 16A with the devices in the system, e.g., system 1500, being initialized and becoming operational. Operation proceeds from step 16002 to step 1604.

In step 1604, the first wireless base station (e.g., wireless base station IAB donor 1502 illustrated in system 1500 of FIG. 15) determines a set of routes for the communication of data from the first wireless base station to a destination wireless base station over wireless backhaul communications links. The first wireless base station is typically an Integrated Access and Backhaul donor connected via wire or fiber optical to a core network. Operation proceeds from 1604 to step 1606.

In step 1606, the first wireless base station identifies each route in the set of routes with a unique path identifier. Operation proceeds from step 1606 to step 1608.

In step 1608, the first wireless base station receives data of a first flow, e.g., a first call flow for communication to a first user equipment device attached to the destination wireless base station. In some embodiments, step 1608 includes sub-step 1610. In sub-step 1610, the first wireless base station receives the data of the first flow from a network, e.g., a core network, over a wired or fiber optic link connecting the network to the first wireless base station. Operation proceeds from step 1610 to step 1612.

In step 1612, the first wireless base station, selects one or more of the routes of the set of routes from the first wireless base station to the destination wireless base station, the selection being based on multi-Radio Access Technology (Multi-RAT) capability of the wireless base stations of which a route is comprised. In some embodiments step 1612 includes sub-step 1614. In sub-step 1614, the selection by the first wireless base station of one or more of the routes from the first wireless base station to the destination wireless base station is further based on one or more of the following: (i) operation of a Radio Access Technology in licensed versus unlicensed spectrum, e.g., for each backhaul links of the route (ii) operation of a Radio Access Technology in sub-6 GHz frequency spectrum vs. Millimeter Wave spectrum (i.e., band of spectrum between 30 GHz and 300 GHz), (iii) performance metrics of a Radio Access Technology (throughput, access delay/jitter), e.g., reported by wireless base stations (IAB donors and IAB nodes) of which a route is comprised, (iv) number of transitions between Radio Access Technologies required by a route (e.g., number of times transitions from one RAT, e.g., 5G New Radio, to another RAT, e.g., non-5G NR such as WiGig, required by the route), (v) number of Backhaul Adaptation Protocol to Backhaul Offload Adaptation Protocol transitions required by a route, (vi) number of backhaul offload adaptation Protocol transitions to Backhaul Adaptation Protocol transitions, (vii) one or more attributes of the first flow (e.g., quality of service requirement(s), a reliability requirement, and/or a flow delay budget, (viii) load balancing of traffic on the backhaul wireless communications links of the network. Operation proceeds from step 1612 to one of step 1616, 1672 or 1692 depending on the selection made in step 1612. The selection in some embodiments also being dependent on the configuration of the communications system.

In step 1616, the first wireless base station selects a first route from the set of routes. The first route including a second wireless base station located between the first wireless base station and the destination wireless base station on the selected route. For example, with respect to system 1500. An exemplary user equipment device is 1510 which is attached to the destination wireless base IAB Node 3 1508. An exemplary first route is route including first wireless base station 1502, the second wireless base station 1504 and the destination wireless base station 1508. An alternative route would include wireless base station 1502, wireless base station IAB node 2 1506 as the second wireless base station and with the destination wireless base station being wireless base station IAB node 3 1508. In this example, the first selected route is route with multi-RAT wireless backhaul communications link (RAT 1 backhaul communications link and RAT 2 backhaul communications link) connecting each of the wireless base station while in the alternative route each of the base stations is connected via a unitary backhaul communications link (RAT 1 backhaul communications link). In some embodiments, step 1616 is a sub-step of step 1612. Operation proceeds from step 1616 via connection node A 1618 to step 1620 shown on FIG. 16B.

In step 1620, the first wireless base station generates Backhaul Adaptation Protocol-Protocol Data Units (BAP-PDUs) including the received data of the first flow, e.g., BAP Data PDUs. In some embodiments, step 1620 includes sub-step 1622. In sub-step 1622, the first wireless base station generates a first Backhaul Adaptation Protocol-Protocol Data Unit (BAP-PDU) including: entering an indication in the first BAP-PDU header that the first BAP-PDU is a data PDU, including the address of the destination wireless base station in the destination field of the first BAP-PDU header, including the path identifier for the selected first route in the header path field of the first BAP-PDU, and including at least a portion of the received data of the first flow in the data field of the first BAP-PDU. Operation proceeds from step 1620 to step 1624.

In step 1624, the first wireless base station generates Backhaul Offload Adaptation Protocol packets, each generated Backhaul Offload Adaptation Protocol (BOAP) packet encapsulating one or more Backhaul Adaptation Protocol-Protocol Data Unit, the BAP-PDUs containing the received data and a destination address of the destination wireless base station. In some embodiments, step 1624 includes sub-step 1626. In sub-step 1626, the first wireless base station generates a first BOAP packet based on the first BAP-PDU. In some embodiments, sub-step 1626 includes sub-step 1626. In sub-step 1628, the first BAP-PDU encapsulates the first BAP-PDU in a BOAP packet, the BOAP packet including a header and a data field. The header including information identifying the first BOAP packet as a BOAP packet and the data field including the first BAP-PDU packet. The BOAP packet then being placed in a data payload or MAC frame body for transmission from the first wireless base station to the second wireless base station over a non-5G New Radio RAT backhaul communications link.

In some embodiments, the wireless base station does not encapsulate the BAP-PDUs in BOAP packets but instead inserts the BAP PDUs directly into the data payload field or MAC frame body of a Wi-Fi or WiGig or other 802.11 MAC frame for transmission from the first wireless base station to the second wireless base over a Wi-Fi or WiGig or other 802.11 RAT protocol.

The first wireless base station uses the address for the second wireless base station and selected route information to generate the MAC address information included in the MAC header in accordance with the selected radio access technology protocol which in this example is Wi-Fi or WiGig or other 802.11 RAT protocol.

Operation proceeds from step 1624 to step 1630. In step 1630, the first wireless base station transmits the generated BOAP packets to the second wireless base station via a radio access technology wireless backhaul communications link which is not a 5G New Radio wireless backhaul communications link. For example, with respect to system 1500 wireless base station 1502 transmits the BOAP packets to the second wireless base station 1504 over wireless backhaul communications link 1518 is a RAT 2 communications link which is not a 5G New Radio RAT link. In some embodiments, step 1630 includes sub-step 1632. In sub-step 1632, the first wireless base station transmits to the second wireless base station BOAP packets via a non-3GPP RAT wireless backhaul communications link, e.g., one of the following Radio Access Technologies 802.11ad RAT, 802.11ay RAT, 802.11ac RAT, 802.11ax RAT links. Operation proceeds from step 1632 to step 1634.

In step 1634, the second wireless base station receives the transmitted BOAP packets via the backhaul radio access technology wireless communications link over which the BOAP packets were transmitted. The BOAP packets including the BAP-PDUs. Operation proceeds from step 1634 to step 1636.

In step 1636, the second wireless base station decapsulates the BAP-PDUs which are encapsulated in the BOAP packets which are included in the MAC frame body or the packet payload of the wireless RAT protocol used to communicate the data between the first wireless base station and the second wireless base station. In some embodiments, the decapsulating the encapsulated BAP-PDUs includes extracting the BAP-PDUs from the BOAP packet data fields. In some embodiments in which a BOAP packet is not utilized but the BAP-PDUs are inserted directly into the MAC frame body decapsulating the BAP-PDUs includes extracting the BAP-PDUs from the MAC frame body of the received message. In some embodiments, step 1636 includes sub-step 1638. In step 1638, the second wireless base station decapsulates the first BAP-PDU encapsulated in the first BOAP packet. In some embodiments in which the first BAP-PDU is inserted directly into the MAC frame body, the first BAP-PDU is extracted from a first received MAC frame's frame body. Operation proceeds from step 1636 via connection node B 1640 to step 1642 shown on FIG. 16C.

In step 1642, the second wireless base station extracts header information from the decapsulated BAP-PDUs. In some embodiments step 1642 includes sub-step 1644. In sub-step 1644, the second wireless base station extracts header information from the first BAP-PDU including the destination address and path information, e.g., path identity. Operation proceeds from step 1644 to step 1646.

In step 1646, the second wireless base station determines whether or not the second wireless base station is the destination for the received BAP-PDUs based on the extracted header information. In some embodiments, step 1646 includes sub-step 1648. In sub-step 1648, the second wireless base station determines whether or not the second wireless base station is the destination for the received first BAP-PDU based on the extracted header information. In some embodiments sub-step 1648 includes sub-step 1650. In sub-step 1650, the second wireless base station compares the destination address extracted from the first BAP-PDU header and compares it to the address of the second wireless base station and determines that the second wireless base station is the destination address if the comparison results in a match otherwise the second wireless base station determines that the second wireless base is not the destination. Operation proceeds from step 1646 to step 1652.

In step 1652, when the second wireless base station determines that it is not the destination for the received BAP-PDUs, the second wireless base station selects one or more wireless backhaul RAT wireless base communications links to use for transmitting the received BAP-PDUs from the second wireless base station to a next hop in the first route to the destination wireless base station. In some embodiments, the address of the next hop in the route is determined based on the path information included in the header of BAP-PDUs. In some embodiments, the next hop is determined based on the destination address included in the BAP-PDUs and a routing table maintained by the second wireless base station containing available routes from the second wireless base station to destination wireless base station, e.g., a table of routes ranked by performance metrics of the routes and/or one or more of the items previously considered in 1612 and/or sub-step 1614 for selecting one or more routes. In some embodiments, performance metrics of the backhaul RAT links that connect the second wireless base station to the wireless base station at the next hop are utilized to determine which of the backhaul RAT links to utilize in communicating the data to the next hop. For example, in system 1500 the next hop is the destination wireless base station IAB node 3 1508 which is connected to wireless base station IAB node 1 1504 via wireless backhaul RAT 1 link and wireless backhaul RAT 2 link. In determine which whether to use RAT 1 link, RAT 2 link or RAT 1 and RAT 2 link the second wireless base station in some embodiments, determines to use RAT 1 when it detects that RAT 2 link has poor performance metrics or has failed. Similarly, the second wireless base station may determine to use RAT 2 if it detects that RAT 1 has poor performance metrics or has failed. The wireless base station may also use RSSI measurements to determine which of the RAT 1 or RAT 2 links to utilize. Similarly, the second wireless base station may determine to use both RAT 1 and RAT 2 link sending a first portion of the BAP-PDUs on the RAT 1 link and a second portion, e.g., the remaining portion of the BAP-PDUS on the RAT 2 link. In some embodiments, the path identifier in a BAP-PDU's header dictates or identifies a preferred or mandatory RAT link to utilize to communicate the BAP PDU to the next hop. Operation proceeds from step 1652 to step 1654.

In step 1654, when a 5G New Radio RAT wireless backhaul link is selected as one of the one or more routes to transmit one or more of the received BAP-PDUs to the next hop, the second wireless base station generates new BAP-PDUs based on one or more of the received BAP-PDUs for transmission to the next hop or retains/maintains one or more received BAP-PDUs to use for transmission to the next hop. That is in some embodiments, the BAP-PDUs do not need to be generated but the received BAP-PDUs, e.g., the received first BAP-PDU, is retained or stored, e.g., in memory or a buffer, intact for transmission to the next hop in the route. In some embodiments in which the route is changed due a failure of link in the route or a wireless base station or node along the route, the new BAP-PDUs will be regenerated to update the path information.

Operation proceeds from step 1654 to step 1656. In step 1656, when a non-3GPP RAT wireless backhaul link, e.g., WiGig link or Wi-Fi link, is selected as one of the one or more routes to transmit one or more of the received BAP-PDUs to the next hop, the second wireless base station: (i) generates new BAP-PDUs based on one or more of the received BAP-PDUs for transmission to the next hop or retains/maintains one or more received BAP-PDUs to use for transmission to the next hop, (ii) generate one or more BOAP packets which encapsulate the generated one or more BAP-PDUs or retained/maintained BAP-PDUs, or (iii) retains/maintains in tack, e.g., by storing memory or a buffer, one or more received BOAP packets for transmission to the next hop. That is in some embodiments, the BOAP packets do not need to be generated but the received BOAP packets, e.g., the received first BOAP packet, is retained or stored, e.g., in memory or a buffer, in tact for transmission to the next hop in the route. In some embodiments in which the route is changed due a failure of link in the route or a wireless base station or node along the route, the new BAP-PDUs will be generated to update the path information resulting in new BOAP packets being generated which encapsulate the newly generated BAP-PDUs. The BOAP packets are then placed or inserted into the packet payload or MAC frame body of the non-3GPP RAT protocol. In some embodiments in step 1656, BOAP packets are not utilized but the BAP-PDUs are directly inserted into the packet payload or MAC frame body of non-3GPP RAT protocol. Operation proceeds from step 1656 to step 1660 shown on Figure via connection node C 1658. to step 1660.

In step 1660, the BAP-PDUs are transmitted to the next hop in the route to the destination wireless base stations via the selected one or more wireless backhaul communications links. For example, with respect to system 1500, 50% of the BAP-PDUs may be transmitted over the wireless backhaul RAT link 1 1522 and the other 50% may be transmitted over the wireless backhaul RAT link 2 1524 to destination wireless base station IAB Node 3 to which the UE 1510 is attached. The RAT 1 link 1522 being a 5G New Radio radio access technology backhaul link and the RAT 2 link 1524 being a non-3GPP RAT link. The BAP-PDUs being encapsulated in the BOAP packets or directly inserted into the packet payload or MAC frame body of the non-3GPP RAT 2 protocol messages communicated from the second wireless base station 1504 to the destination wireless base station 1508. Operation proceeds from step 1660 to step 1662.

In step 1662, the destination wireless base station receives and extracts the BAP-PDUs transmitted from the second wireless base station. Operation proceeds from step 1662 to step 1664.

In step 1664, the destination wireless base station determines that it is the destination of the received BAP-PDUs based on the header information, e.g., destination address in the header, in the received BAP-PDUs. Operation proceeds from step 1664 to step 1666.

In step 1666, the destination wireless base station, extracts the data from the data field of the BAP-PDUs and transmits the data to the target user equipment device attached to the destination wireless base station which in this example is the UE 1510. The data is transmitted over the RAT 1 access link 1528 from the destination wireless base station to the UE 1510. Operation proceeds from step 1666 to step 1668.

In step 1668, the process continues for additional backhaul data communications, e.g., for the transfer of data between the user equipment attached to the wireless base stations and the network.

Returning to step 1612, operation proceeds from step 1612 to step 1672 via connection node D 1670 when the first wireless base station selects multiple routes from the set of routes when the first flow reliability requirement attribute is greater than a first threshold value, e.g., a first reliability threshold value. This is an alternative to the selection made in step 1616. In some embodiments, step 1672 is a sub-step of step 1612.

In some embodiments, step 1672 includes one or more sub-steps 1674, 1676, 1678, and 1680. In sub-step 1674, the first wireless base station selects at least one of the multiple routes based on the route consisting of only 5G New Radio RAT backhaul communications links. In sub-step 1676, the first wireless base station selects at least one of the multiple routes based on minimizing BAP to/from BOAP transitions. In sub-step 1678, the first wireless base station selects the multiple routes so that the selected routes traverse different intermediate wireless base stations between the first wireless base station and the destination wireless base station. In sub-step 1680, the first wireless base station selects one or more routes to maximize the number of intermediate wireless base stations having multi-RAT capability. Operation proceeds from step 1680 to step 1682.

In step 1682, the same data of the first flow is transmitted across the selected multiple routes from the first wireless base station to the destination wireless base station concurrently or in parallel. The use of the multiple routes being in response to the reliability requirements of the flow. Operation proceeds from step 1682 via connection node E 1684 to step 1686 shown on FIG. 16E.

In step 1686, upon receiving the transmitted data, the destination wireless base station, discards redundant data and forwards the data of the flow to the target user equipment device which is attached to the destination wireless base station. Operation proceeds from step 1686 to step 1688.

In step 1688, the process continues for additional backhaul data communications, e.g., for the transfer of data between the user equipment attached to the wireless base stations and the network.

Returning to step 1612, operation proceeds from step 1612 to step 1692 shown on FIG. 16F via connection node F 1690 when the first wireless base station selects a route with multi-RAT wireless communication backhaul links between the first wireless base station and the second wireless base station and wherein multiple RAT wireless communications backhaul links are selected to be used to transmit the data received from the first wireless base station to the second wireless base station. This is an alternative to the selection made in step 1616 and 1672. In some embodiments, step 1692 is a sub-step of step 1612.

In step 1692, the first wireless base station selects a first route from the set of routes. The first route including a second wireless base statin connected to the first wireless base station via a first RAT wireless backhaul link and a second RAT wireless back haul link. The first and second RAT wireless back haul links being different radio access technologies. The first RAT radio access technology being 5G New Radio radio access technology and said second RAT radio access technology being a non-3GPP radio access technology. In this example, the second wireless base is a multi-RAT device capable of communicating using said first Radio Access Technology and said second Radio Access Technology. In some embodiments, the second Radio Access Technology is one of 802.11 ad radio access technology, 802.11 ay radio access technology, 802.11 ac radio access technology, 802.11 be radio access technology, or 802.11 ax radio access technology. Operation proceeds from step 1692 to step 1696.

In step 1696, the first wireless base station determines a first portion f the data received by the first wireless base to communicate to the second wireless base station over the second RAT wireless backhaul link. Operation proceeds from step 1696 to step 1700.

In step 1700, the first wireless base station determines a second portion of the data received by the first wireless base station to communicate to the second wireless base station over the first RAT wireless backhaul link. In most embodiments, the second portion is the remaining portion of the received data which is not sent over the second RAT wireless backhaul link. In some embodiments, multiple paths with multiple RAT wireless backhaul links are used. In such an embodiment, the first wireless base station divides or apportions the received data determining a portion or amount to second over each of the multiple RAT wireless backhaul links being used. Operation proceeds from step 1700 to steps 1702 and 1710.

In step 1702, the first wireless base station generates one or more Backhaul Adaptation Protocol Data Protocol Data Units containing data from the first portion of data received by the first wireless base station. In some embodiments step 1702 includes generating a first Backhaul Adaptation Protocol Data Protocol Data Unit including a header with the destination address of the destination wireless base station being included in the destination header field. Operation proceeds from step 1702 to step 1704.

In step 1704, the first wireless base station generates one or more Backhaul Offload Adaptation Protocol packets including one or more Backhaul Protocol Data Protocol Data Units containing data from the first portion of data received by the first wireless base station. In some embodiments, step 1704 includes encapsulating the first Backhaul Adaptation Protocol Data Protocol Data Unit in a first Backhaul Offload Adaptation Protocol packet. Operation proceeds from step 1704 to step 1706.

In step 1706, the first wireless base station inserts the first Backhaul Offload Adaptation Protocol packet in a frame body, data payload, or packet data unit of a second radio access technology protocol message, e.g., in the data field of the WiGig Protocol Data Unit. In some embodiments, the second RAT is 802.11 ay and the first Backhaul Offload Adaptation Protocol packet is inserted into a frame body of a 802.11 ay MAC frame. Operation proceeds from step 1706 to step 1708.

In step 1708, the first wireless base station transmits from the first wireless base to the second wireless base station over the second RAT wireless backhaul link the one or more generated Backhaul Offload Adaptation Protocol packets. Operation proceeds from step 1708 via connection node G 1714 to step 1716 shown on FIG. 16G.

Returning to step 1710, in step 1710, the first wireless base station generates one or more Backhaul Adaptation Protocol Data Protocol Data Units containing data from the second portion of data received by the first wireless base station, i.e., the second portion being the portion of received data to be sent over the first wireless backhaul communications link which is 5G NR backhaul communications link. Operation proceeds from step 1710 to step 1712.

In step 1712, the first wireless base station transmits from the first wireless base station to the second wireless base station over the first RAT wireless backhaul link the one or more generated Backhaul Adaptation Protocol Data Protocol Data Units containing the second portion of the data received by the first wireless base station. Operation proceeds from step 1712 via connection node G 1714 to step 1716 shown on FIG. 16G.

In step 1716, the second wireless base station receives the BAP Data PDUs and BOAP packets from the first wireless base station. Operation proceeds from step 1716 to step 1718.

In step 1718, the second wireless base station extracts the BAP Data PDUs from the BOAP packets. Operation proceeds from step 1718 to step 1720.

In step 1720, when the second wireless base station is determined to be the destination for the received BAP Data PDUs and extracted BAP Data PDUs, the second wireless base station extracts the first portion of data from the extracted BAP Data PDUs and the second portion of data from the received BAP data PDUs and transmits the data to the target user equipment device which is attached to the destination wireless base station. Operation proceeds from step 1722 to step 1732.

In step 1720, the second wireless base station determines from header information of the BAP Data PDUs received and the BAP Data PDUs extracted from the BOAP packets whether the second wireless base station is the destination for the received BAP Data PDUs and extracted BAP Data PDUs. Operation proceeds from step 1720 to either step 1722 or step 1724 depending on the whether the second wireless base station determines that it is the destination or it is not the destination for the BAP Data PDUs received and extracted. This determination in most embodiments is made on an individual BAP Data PDU basis wherein the destination address is extracted from the BAP Data PDU and used to determine if the second wireless base station is the destination or not of the BAP Data PDU.

In step 1724, when the second wireless base station is determined not to be the destination for the received BAP Data PDUs and extracted BAP Data PDUs, the second wireless base station determines the next hop on the route to the destination wireless base station and identifies one or more wireless backhaul communications links to transmit the received and extracted BAP Data PDUs to the next hop wireless base station on the route to the destination wireless base station. In some embodiments, the determination is based at least in part on a path identifier included in the header of the BAP Data PDUs and/or using routing tables stored at the second wireless base station. When multiple wireless backhaul communications links are selected to transmit the BAP Data PDUs, the portion of the combined BAP Data PDUs received and extracted to transmit to the next hop wireless base station over each of the multiple wireless backhaul communications links is determined. For example, if there are four backhaul wireless communications links between the second wireless base station and the next hop wireless base station, the percentage of BAP Data PDUs which are sent over each link is determined, e.g., 25% over each backhaul link for an even distribution. Operation proceeds from step 1724 to step 1726.

In step 1726, the second wireless base station encapsulates the BAP data PDUs to be transmitted over non-3GPP New Radio RAT links in BOAP packets as previously described. BAP data PDUs to be transmitted over 3-GPP New Radio RAT links do not need to be encapsulated in BOAP packets so this step is bypassed for those BAP Data PDUs to be sent over 5G New Radio RAT backhaul links. Operation proceeds from step 1726 to step 1728.

In step 1728, the second wireless base station transmits the BAP Data PDUs and BOAP packets to the next hop wireless base station. Operation proceeds from step 1728 to step 1730.

In step 1730, the process is repeated for each wireless base station on the route to the destination wireless base station, when the destination wireless base station receives the BAP Data PDUs and/or BOAP packets, the destination wireless base station extracts the data from the BAP Data PDUs and the BOAP packets and transmits the data to the target user equipment device which is attached to the destination wireless base station. Operation proceeds from step 1730 to step 1732.

In step 1732, the steps of the method/process is repeated for additional backhaul data communications.

Various exemplary embodiments illustrating different features of the present invention will now be discussed.

List of Set of Exemplary Numbered Method Embodiments

Method Embodiment 1. A wireless communications method comprising: determining a set of routes for the communication of data from a first wireless base station to a destination wireless base station over wireless backhaul communications links, said first wireless base station being an Integrated Access and Backhaul (IAB) donor; identifying each route in the set of routes with a unique path identifier; receiving data of a first flow at the first wireless base station for communication to a first wireless user equipment device attached to the destination wireless base station; and selecting, at the first wireless base station, one or more of the routes of the set of routes from the first wireless base station to the destination wireless base station, said selection being based on multi-Radio Access Technology (multi-RAT) capability of wireless base stations of which a route is comprised.

Method Embodiment 2. The wireless communications method of Method Embodiment 1, wherein the destination wireless base station and any other wireless base stations in the determined set of routes are Integrated Access and Backhaul (IAB) nodes.

Method Embodiment 2A. The wireless communications method of Method Embodiment 2 further comprising: during establishment of each IAB node, broadcasting by the IAB node the non-3GPP RAT availability and capability to other IAB nodes and IAB donors to which it is connected.

Method Embodiment 2A1. The wireless communications method of Method Embodiment 2A further comprising: measuring by an established IAB node non-3GPP performance metrics over a first period of time; and broadcasting the measured non-3GPP performance metrics to other IAB nodes and/or IAB donors to which it is connected.

Method Embodiment 2B. The wireless communications method of Method Embodiment 1, wherein the first wireless base station receives said data of the first flow from a core network over a wired or fiber optic link.

Method Embodiment 2C. The wireless communications method of Method Embodiment 1, wherein the first flow is a first call flow.

Method Embodiment 2D. The wireless communications method of Method Embodiment 1, wherein the first wireless user equipment device includes a 5G New Radio radio access technology wireless interface for receiving and transmitting messages.

Method Embodiment 3. The wireless communications method of Method Embodiment 1 further comprising: selecting a first route from the set of routes, said first route including a second wireless base station located between the first wireless base station and the destination wireless base station on the selected first route; transmitting, by the first wireless base station, to the second wireless base station the received data of the first flow in Backhaul Offload Adaptation Protocol (BOAP) packets via a Radio Access Technology wireless communications link which is not 5G New Radio.

Method Embodiment 3A. The wireless communications method of Method Embodiment 3, wherein the backhaul Radio Access Technology wireless communications link is a non-3GPP Radio Access Technology.

Method Embodiment 3B. The wireless communications method of Method Embodiment 3A, wherein the backhaul Radio Access Technology wireless communications link is one of the following: 802.11 ad, 802.11 ay, 802.11 ac, 802.11 be, and 802.11 ax.

Method Embodiment 3C. The wireless communications method of Method Embodiment 3B, wherein each of the wireless base stations in each determined route of the set of routes includes a plurality of 5G New Radio radio access technology wireless interfaces.

Method Embodiment 4. The wireless communications method of Method Embodiment 3, further comprising: prior to transmitting said Backhaul Offload Adaptation Protocol (BOAP) packets, generating, by the first wireless base station, said Backhaul Offload Adaptation Protocol (BOAP) packets, each generated Backhaul Offload Adaptation Protocol (BOAP) packet encapsulating one or more Backhaul Adaptation Protocol-Protocol Data Units (BAP-PDUs), said Backhaul Adaptation Protocol-PDUs containing said received data and a destination address of the destination wireless base station.

Method Embodiment 5. The wireless communications method of Method Embodiment 4, further comprising: receiving, by the second wireless base station, the transmitted Backhaul Offload Adaptation Protocol (BOAP) packets via the backhaul Radio Access Technology wireless communications link which is not 5G New Radio; decapsulating, by the second wireless base station, the BAP-PDUs; extracting header information from the decapsulated BAP-PDUs; determining, by the second wireless base station, whether or not the second wireless base station is the destination for the received BAP-PDUs based on the extracted header information; and when the second wireless base station determines it is not the destination for the received BAP-PDUs, selecting one or more different wireless backhaul Radio Access Technology communications links to use for transmitting the received BAP-PDUs from the second wireless base station to a next hop in the first route to the destination wireless base station.

Method Embodiment 5B. The wireless communications method of Method Embodiment 5, further comprising: when a 5G New Radio RAT wireless backhaul link is selected to transmit the BAP-PDUs to the next hop, generating BAP-PDUs based on the received BAP-PDUs; and when a non-3GPP RAT wireless backhaul link is selected to transmit the BAP-PDUs to the next hop, generating BAP-PDUs based on the received BAP-PDUs and then generating BOAP packets which encapsulate the generated BAP-PDUs.

Method Embodiment 5C. The wireless communications method of Method Embodiment 5, wherein the extracted header information is the destination address; and wherein the second wireless base station determines whether or not the second wireless base station is the destination for the received BAP-PDUs by determining if the destination address in the header field of the BAP-PDUs matches an address of the second wireless base station.

Method Embodiment 6. The wireless communications method of Method Embodiment 2, wherein said selection, at the first wireless base station, of one or more of the routes of the set of routes from the first wireless base station to the destination wireless base station is further based on one or more of the following: (i) operation of a Radio Access Technology in licensed versus unlicensed spectrum, (ii) operation of a Radio Access Technology in sub-6 GHz versus mm-wave spectrum, (iii) performance metrics of a Radio Access Technology (throughput, access delay/jitter), (iv) delay budget and reliability requirement of the first flow, (v) number of transitions between Radio Access Technologies required by the route, (vi) number of Backhaul Adaptation Protocol to Backhaul Offload Adaptation Protocol transitions required by the route, (vii) number of Backhaul Offload Adaptation Protocol to Backhaul Adaptation Protocol transitions required by the route.

Method Embodiment 6A. The wireless communications method of Method Embodiment 1, wherein said selection of one or more of the routes of the set of routes from the first wireless base station to the destination wireless base station is further based on one or more attributes of the first flow.

Method Embodiment 6B. The wireless communications method of Method Embodiment 6A, wherein the attributes of the first flow include one or more of the following: a quality of service requirement, a reliability requirement and a delay budget.

Method Embodiment 6C. The wireless communications method of Method Embodiment 6B further comprising: selecting multiple routes from the set of routes when the first flow reliability requirement attribute is greater than a first threshold value; and transmitting the same data of the first flow across the selected multiple routes from the first wireless base station to the destination wireless base station concurrently or in parallel.

Method Embodiment 7. The wireless communications method of Method Embodiment 2, wherein the first wireless base station is a multi-Radio Access Technology device capable of communicating using a first Radio Access Technology and a second Radio Access Technology, said first Radio Access Technology being 5G New Radio radio access technology and said second Radio Access Technology being a non-3GPP Radio Access Technology; wherein the first wireless base station selects a first route from the set of routes, said first route including a second wireless base station connected to the first wireless base station via a first RAT wireless backhaul link and a second RAT wireless backhaul link; and wherein said second wireless base station is a multi-Radio Access Technology device capable of communicating using said first Radio Access Technology and said second Radio Access Technology.

Method Embodiment 7A. The wireless communications method of Method Embodiment 7, wherein the second Radio Access Technology is one of 802.11ad radio access technology, 802.11 ay radio access technology, 802.11 ac radio access technology, 802.11 be radio access technology, or 802.11 ax radio access technology.

Method Embodiment 8. The wireless communications method of Method Embodiment 7, further comprising: determining, by the first wireless base station, a first portion of the data received by the first wireless base station to communicate to the second wireless base station over the second RAT wireless backhaul link; generating, by the first wireless base station, one or more Backhaul Adaptation Protocol Data Protocol Data Units containing data from the first portion of data received by the first wireless base station; and generating, by the first wireless base station, one or more Backhaul Offload Adaptation Protocol packets including one or more Backhaul Adaptation Protocol Data Protocol Data Units containing data from the first portion of data received by the first wireless base station.

Method Embodiment 8A. The wireless communications method of Method Embodiment 8, wherein the step of generating, by the first wireless base station, one or more Backhaul Adaptation Protocol Data Protocol Data Units containing data from the first portion of data received by the first wireless base station includes generating a first Backhaul Adaptation Protocol Data Protocol Data Unit including a header with the destination address of the destination wireless base station being included in the destination header field; and wherein the step of generating, by the first wireless base station, one or more Backhaul Offload Adaptation Protocol packets including one or more Backhaul Adaptation Protocol Data Protocol Data Units containing data from the first portion of data received by the first wireless base station includes encapsulating the first Backhaul Adaptation Protocol Data Protocol Data Unit in a first Backhaul Offload Adaptation Protocol packet.

Method Embodiment 8B. The wireless communications method of Method Embodiment 8A, further comprising: inserting the first Backhaul Offload Adaptation Protocol packet in a frame body, data payload or packet data unit of a second Radio Access Technology protocol message (e.g., in the data field of the WiGig Protocol Data Unit).

Method Embodiment 8C. The wireless communications method of Method Embodiment 8A, wherein the second RAT is 802.11 ay; and wherein the first Backhaul Offload Adaptation Protocol packet is inserted into a frame body of a 802.11 ay MAC frame.

Method Embodiment 9. The wireless communications method of Method Embodiment 8, further comprising: transmitting from the first wireless base station to the second wireless base station over the second RAT wireless backhaul link the one or more generated Backhaul Offload Adaptation Protocol packets.

Method Embodiment 10. The wireless communications method of Method Embodiment 8, further comprising: determining, by the first wireless base station, a second portion of the data received by the first wireless base station to communicate to the second wireless base station over the first RAT wireless backhaul link; generating, by the first wireless base station, one or more Backhaul Adaptation Protocol Data Protocol Data Units containing data from the second portion of data received by the first wireless base station; and transmitting from the first wireless base station to the second wireless base station over the first RAT wireless backhaul link the one or more generated Backhaul Adaptation Protocol Data Protocol Data Units containing the second portion of data received by the first wireless base station.

List of Set of Exemplary Numbered Method Embodiments

System Embodiment 1. A wireless communications system comprising: a first wireless base station, said first wireless base station including memory and a first processor, said first processor configured to control the first wireless base station to perform the following operations: determine a set of routes for the communication of data from the first wireless base station to a destination wireless base station over wireless backhaul communications links, said first wireless base station being an Integrated Access and Backhaul (IAB) donor; identify each route in the set of routes with a unique path identifier; receive data of a first flow at the first wireless base station for communication to a first wireless user equipment device attached to the destination wireless base station; and select, at the first wireless base station, one or more of the routes of the set of routes from the first wireless base station to the destination wireless base station, said selection being based on multi-Radio Access Technology (multi-RAT) capability of wireless base stations of which a route is comprised.

System Embodiment 2. The wireless communications system of System Embodiment 1, wherein the destination wireless base station and any other wireless base stations in the determined set of routes are Integrated Access and Backhaul (IAB) nodes.

System Embodiment 2A. The wireless communications system of System Embodiment 2, wherein during establishment of each IAB node of the wireless communications system, each IAB node broadcasts its non-3GPP RAT availability and capability to other IAB nodes and IAB donors to which it is connected.

System Embodiment 2AA. The wireless communications system of System Embodiment 2A, wherein during establishment of a non-3GPP RAT wireless communications link between two IAB nodes of the wireless communications system, each of the two IAB nodes between which the non-3-GPP RAT wireless communications link is established broadcasts a message including information about the establishment of the non-3GPP RAT wireless communications link to other IAB nodes and IAB donors to which it is connected, said information about the establishment of the non-3GPP RAT wireless communications link including the type of non-3GPP RAT technology employed, the IAB nodes which are connected by the link and/or the multi-RAT capability and availability of the IAB nodes connected by the link.

System Embodiment 2A1. The wireless communications system of System Embodiment 2A, wherein one or more of the established IAB nodes of the wireless communications system each include a processor, each processor controlling the established IAB node in which it is included to perform the operations of: measuring by the established IAB node non-3GPP performance metrics over a first period of time; and broadcasting the measured non-3GPP performance metrics to other IAB nodes and/or IAB donors to which it is connected.

System Embodiment 2B. The wireless communications system of System Embodiment 1, wherein the first wireless base station receives said data of the first flow from a core network over a wired or fiber optic link.

System Embodiment 2C. The wireless communications system of System Embodiment 1, wherein the first flow is a first call flow.

System Embodiment 2D. The wireless communications system of System Embodiment 1, wherein the first wireless user equipment device includes a 5G New Radio radio access technology wireless interface for receiving and transmitting messages.

System Embodiment 3. The wireless communications system of System Embodiment 1, wherein the first processor further controls the first wireless base station to perform the following operations: select a first route from the set of routes, said first route including a second wireless base station located between the first wireless base station and the destination wireless base station on the selected first route; transmit, by the first wireless base station, to the second wireless base station the received data of the first flow in Backhaul Offload Adaptation Protocol (BOAP) packets via a Radio Access Technology wireless communications link which is not 5G New Radio.

System Embodiment 3A. The wireless communications system of System Embodiment 3, wherein the backhaul Radio Access Technology wireless communications link is a non-3GPP Radio Access Technology.

System Embodiment 3B. The wireless communications system of System Embodiment 3A, wherein the backhaul Radio Access Technology wireless communications link is one of the following: 802.11 ad, 802.11 ay, 802.11 ac, 802.11 be, and 802.11 ax.

System Embodiment 3C. The wireless communications system of System Embodiment 3B, wherein each of the wireless base stations in each determined route of the set of routes includes a plurality of 5G New Radio radio access technology wireless interfaces.

System Embodiment 4. The wireless communications system of System Embodiment 3, wherein the first processor further controls the first wireless base station prior to transmitting said Backhaul Offload Adaptation Protocol (BOAP) packets, to perform the following operation: generate, by the first wireless base station, said Backhaul Offload Adaptation Protocol (BOAP) packets, each generated Backhaul Offload Adaptation Protocol (BOAP) packet encapsulating one or more Backhaul Adaptation Protocol-Protocol Data Units (BAP-PDUs), said Backhaul Adaptation Protocol-PDUs containing said received data and a destination address of the destination wireless base station.

System Embodiment 5. The wireless communications system of System Embodiment 4, wherein the second wireless base station includes a second processor, said second processor controlling the second wireless base station to perform the following operations: receive, by the second wireless base station, the transmitted Backhaul Offload Adaptation Protocol (BOAP) packets via the backhaul Radio Access Technology wireless communications link which is not 5G New Radio; decapsulate, by the second wireless base station, the BAP-PDUs; extract header information from the decapsulated BAP-PDUs; determine, by the second wireless base station, whether or not the second wireless base station is the destination for the received BAP-PDUs based on the extracted header information; and when the second wireless base station determines it is not the destination for the received BAP-PDUs, to select, by the second wireless base station, one or more different wireless backhaul Radio Access Technology communications links to use for transmitting the received BAP-PDUs from the second wireless base station to a next hop in the first route to the destination wireless base station.

System Embodiment 5B. The wireless communications system of System Embodiment 5, wherein when a 5G New Radio RAT wireless backhaul link is selected, by the second wireless base station, to transmit the BAP-PDUs to the next hop, the second processor further controls the second wireless base station to perform the operation of generating BAP-PDUs based on the received BAP-PDUs; and when a non-3GPP RAT wireless backhaul link is selected, by the second wireless base station, to transmit the BAP-PDUs to the next hop, the second processor further controls the second wireless base station to perform the operation of generating BAP-PDUs based on the received BAP-PDUs and then generating BOAP packets which encapsulate the generated BAP-PDUs.

System Embodiment 5C. The wireless communications system of System Embodiment 5, wherein the extracted header information is the destination address; and wherein the second wireless base station determines whether or not the second wireless base station is the destination for the received BAP-PDUs by determining if the destination address in the header field of the BAP-PDUs matches an address of the second wireless base station.

System Embodiment 6. The wireless communications system of System Embodiment 2, wherein said selection, at the first wireless base station, of one or more of the routes of the set of routes from the first wireless base station to the destination wireless base station is further based on one or more of the following: (i) operation of a Radio Access Technology in licensed versus unlicensed spectrum, (ii) operation of a Radio Access Technology in sub-6 GHz versus mm-wave spectrum, (iii) performance metrics of a Radio Access Technology (throughput, access delay/jitter), (iv) delay budget and reliability requirement of the first flow, (v) number of transitions between Radio Access Technologies required by the route, (vi) number of Backhaul Adaptation Protocol to Backhaul Offload Adaptation Protocol transitions required by the route, (vii) number of Backhaul Offload Adaptation Protocol to Backhaul Adaptation Protocol transitions required by the route.

System Embodiment 6A. The wireless communications system of System Embodiment 1, wherein said selection of one or more of the routes of the set of routes from the first wireless base station to the destination wireless base station is further based on one or more attributes of the first flow.

System Embodiment 6B. The wireless communications system of System Embodiment 6A, wherein the attributes of the first flow include one or more of the following: a quality of service requirement, a reliability requirement and a delay budget.

System Embodiment 6C. The wireless communications system of System Embodiment 6B, wherein said first processor further controls the first wireless base station to: select multiple routes from the set of routes when the first flow reliability requirement attribute is greater than a first threshold value; and transmit the same data of the first flow across the selected multiple routes from the first wireless base station to the destination wireless base station concurrently or in parallel.

System Embodiment 7. The wireless communications system of System Embodiment 2, wherein the first wireless base station is a multi-Radio Access Technology device capable of communicating using a first Radio Access Technology and a second Radio Access Technology, said first Radio Access Technology being 5G New Radio radio access technology and said second Radio Access Technology being a non-3GPP Radio Access Technology; wherein the first wireless base station selects a first route from the set of routes, said first route including a second wireless base station connected to the first wireless base station via a first RAT wireless backhaul link and a second RAT wireless backhaul link; and wherein said second wireless base station is a multi-Radio Access Technology device capable of communicating using said first Radio Access Technology and said second Radio Access Technology.

System Embodiment 7A. The wireless communications system of System Embodiment 7, wherein the second Radio Access Technology is one of 802.11ad radio access technology, 802.11 ay radio access technology, 802.11 ac radio access technology, 802.11 be radio access technology, or 802.11 ax radio access technology.

System Embodiment 8. The wireless communications system of System Embodiment 7, wherein the first processor further controls the first wireless base station to perform the operations of: determining, by the first wireless base station, a first portion of the data received by the first wireless base station to communicate to the second wireless base station over the second RAT wireless backhaul link; generating, by the first wireless base station, one or more Backhaul Adaptation Protocol Data Protocol Data Units containing data from the first portion of data received by the first wireless base station; and generating, by the first wireless base station, one or more Backhaul Offload Adaptation Protocol packets including one or more Backhaul Adaptation Protocol Data Protocol Data Units containing data from the first portion of data received by the first wireless base station.

System Embodiment 8A. The wireless communications system of System Embodiment 8, wherein the operation of generating, by the first wireless base station, one or more Backhaul Adaptation Protocol Data Protocol Data Units containing data from the first portion of data received by the first wireless base station includes generating a first Backhaul Adaptation Protocol Data Protocol Data Unit including a header with the destination address of the destination wireless base station being included in the destination header field; and wherein the operation of generating, by the first wireless base station, one or more Backhaul Offload Adaptation Protocol packets including one or more Backhaul Adaptation Protocol Data Protocol Data Units containing data from the first portion of data received by the first wireless base station includes encapsulating the first Backhaul Adaptation Protocol Data Protocol Data Unit in a first Backhaul Offload Adaptation Protocol packet.

System Embodiment 8B. The wireless communications system of System Embodiment 8A, wherein the first processor further controls the first wireless base station to perform the operation of: inserting the first Backhaul Offload Adaptation Protocol packet in a frame body, data payload or packet data unit of a second Radio Access Technology protocol message (e.g., in the data field of the WiGig Protocol Data Unit).

System Embodiment 8C. The wireless communications system of System Embodiment 8A, wherein the second RAT is 802.11 ay; and wherein the first Backhaul Offload Adaptation Protocol packet is inserted into a frame body of a 802.11 ay MAC frame.

System Embodiment 9. The wireless communications system of System Embodiment 8, wherein the first processor further controls the first wireless base station to perform the operation of: transmitting from the first wireless base station to the second wireless base station over the second RAT wireless backhaul link the one or more generated Backhaul Offload Adaptation Protocol packets.

System Embodiment 10. The wireless communications system of System Embodiment 8, wherein the first processor further controls the first wireless base to perform the operations of: determining, by the first wireless base station, a second portion of the data received by the first wireless base station to communicate to the second wireless base station over the first RAT wireless backhaul link; generating, by the first wireless base station, one or more Backhaul Adaptation Protocol Data Protocol Data Units containing data from the second portion of data received by the first wireless base station; and transmitting from the first wireless base station to the second wireless base station over the first RAT wireless backhaul link the one or more generated Backhaul Adaptation Protocol Data Protocol Data Units containing the second portion of data received by the first wireless base station.

List of Set of Exemplary Numbered Non-Transitory Computer Readable Medium Embodiments Non-Transitory Computer Readable Medium Embodiment 1. A non-transitory computer readable medium including a first set of computer executable instructions which when executed by a processor of a first wireless base station, which is an Integrated Access and Backhaul donor, cause the wireless base station to perform the steps of: determining a set of routes for the communication of data from the first wireless base station to a destination wireless base station over wireless backhaul communications links; identifying each route in the set of routes with a unique path identifier; receiving data of a first flow at the first wireless base station for communication to a first wireless user equipment device attached to the destination wireless base station; and selecting one or more of the routes of the set of routes from the first wireless base station to the destination wireless base station, said selection being based on multi-Radio Access Technology (multi-RAT) capability of wireless base stations of which a route is comprised.

Non-Transitory Computer Readable Medium Embodiment 2. The non-transitory computer readable medium of Non-Transitory Computer Readable Medium Embodiment 1, wherein the first wireless base station is a multi-Radio Access Technology device capable of communicating using a first Radio Access Technology and a second Radio Access Technology, said first Radio Access Technology being 5G New Radio radio access technology and said second Radio Access Technology being a non-3GPP Radio Access Technology; wherein the first wireless base station selects a first route from the set of routes, said first route including a second wireless base station connected to the first wireless base station via a first RAT wireless backhaul link and a second RAT wireless backhaul link; and wherein said second wireless base station is a multi-Radio Access Technology device capable of communicating using said first Radio Access Technology and said second Radio Access Technology.

In various embodiments of the present invention, in the Backhaul Offload Adaptation Protocol layer, the wireless base station/IAB donor/IAB node translate BAP-PDUs into non-3GPP RAT functionality, e.g., encapsulating BAP-PDUs in 802.11 ay MAC frame bodies of MAC frames and translating addresses from the BAP-PDU to the MAC addresses of the non-3GPP RAT protocol. Similarly, on receipt of the transmitted messages over the non-3GPP RAT backhaul link, the wireless base station/IAB donor/IAB node extracts the BAP-PDUs from the received messages. While the implementation of both the receiving and transmission function of the BOAP layer and the BAP layer has been discussed as being co-located in the same device, e.g., a wireless base station, the receiving and transmitting functionality may be, and in some embodiments is, not co-located but located in two separate devices.

Various embodiments of the present invention provide techniques, methods and apparatus for utilizing multi-Radio Access Technology in Integrated Access and Backhaul networks which are currently limited to just a single Radio Access Technology, i.e., 5G New Radio RAT. Thereby improving the efficiency, robustness and adaptability to traffic loads of Integrated Access and Backhaul networks in mixed technology networks which utilize a plurality of different Radio Access Technologies.

The techniques of various embodiments may be implemented using software, hardware and/or a combination of software and hardware. Various embodiments are directed to apparatus, e.g., wireless base stations, user equipment devices, wireless devices, wireless endpoint stations, IAB donors, IAB nodes, user devices, subscriber devices, nodes and/or elements. Various embodiments are also directed to methods, e.g., method of controlling and/or operating wireless base stations, user equipment devices, wireless devices, wireless endpoint stations, IAB donors, IAB nodes, user devices, subscriber devices, nodes and/or elements Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, wireless base stations, user equipment devices, wireless devices, wireless endpoint stations, IAB donors, IAB nodes, user devices, subscriber devices, nodes and/or elements described herein are implemented using one or more components to perform the steps corresponding to one or more methods, for example, selecting routes, generating BAP-PDUs, generating BOAP packets, encapsulating BAP-PDUs, decapsulating BAP-PDUs, establishing nodes, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless base station, IAB node, IAB donor, user equipment device, including a processor configured to implement one, multiple or all of the steps of one or more methods of the invention.

In some embodiments, the processor or processors, e.g., CPUs, of one or more devices, e.g., wireless base stations, user equipment devices, wireless devices, wireless endpoint stations, IAB donors, IAB nodes, user devices, subscriber devices, nodes and/or elements are configured to perform the steps of the methods described as being performed by the wireless base stations, user equipment devices, wireless devices, wireless endpoint stations, IAB donors, IAB nodes, user devices, subscriber devices, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, user equipment devices, wireless devices, wireless endpoint stations, IAB donors, IAB nodes, user devices, subscriber devices, nodes and/or elements, with a processor which includes a component corresponding to each of the steps of the various described methods performed by the device in which the processor is included. In some but not all embodiments a device, e.g., wireless base stations, user equipment devices, wireless devices, wireless endpoint stations, IAB donors, IAB nodes, user devices, subscriber devices, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a wireless base stations, user equipment devices, wireless devices, wireless endpoint stations, IAB donors, IAB nodes, user devices, subscriber devices, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such wireless base stations, user equipment devices, wireless devices, wireless endpoint stations, IAB donors, IAB nodes, user devices, subscriber devices, nodes and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A wireless communications method comprising:
   determining a set of routes for the communication of data from a first wireless base station to a destination wireless base station over wireless backhaul communications links, said first wireless base station being an Integrated Access and Backhaul (IAB) donor;
   identifying each route in the set of routes with a unique path identifier;
   receiving data of a first flow at the first wireless base station for communication to a first wireless user equipment device attached to the destination wireless base station; and
   selecting, at the first wireless base station, one or more of the routes of the set of routes from the first wireless base station to the destination wireless base station, said selection being based on multi-Radio Access Technology (multi-RAT) capability of wireless base stations of which a route is comprised.

2. The wireless communications method of claim 1, wherein the destination wireless base station and any other wireless base stations in the determined set of routes are Integrated Access and Backhaul (IAB) nodes.

3. The wireless communications method of claim 1 further comprising:
   selecting a first route from the set of routes, said first route including a second wireless base station located between the first wireless base station and the destination wireless base station on the selected first route;
   transmitting, by the first wireless base station, to the second wireless base station the received data of the first flow in Backhaul Offload Adaptation Protocol (BOAP) packets via a Radio Access Technology wireless communications link which is not 5G New Radio.

4. The wireless communications method of claim 3, further comprising:
   prior to transmitting said Backhaul Offload Adaptation Protocol (BOAP) packets, generating, by the first wireless base station, said Backhaul Offload Adaptation Protocol (BOAP) packets, each generated Backhaul Offload Adaptation Protocol (BOAP) packet encapsulating one or more Backhaul Adaptation Protocol-Protocol Data Units (BAP-PDUs), said Backhaul Adaptation Protocol-PDUs containing said received data and a destination address of the destination wireless base station.

5. The wireless communications method of claim 4, further comprising:
receiving, by the second wireless base station, the transmitted Backhaul Offload Adaptation Protocol (BOAP) packets via the backhaul Radio Access Technology wireless communications link which is not 5G New Radio;
decapsulating, by the second wireless base station, the BAP-PDUs;
extracting header information from the decapsulated BAP-PDUs;
determining, by the second wireless base station, whether or not the second wireless base station is the destination for the received BAP-PDUs based on the extracted header information; and
when the second wireless base station determines it is not the destination for the received BAP-PDUs, selecting one or more different wireless backhaul Radio Access Technology communications links to use for transmitting the received BAP-PDUs from the second wireless base station to a next hop in the first route to the destination wireless base station.

6. The wireless communications method of claim 2, wherein said selection, at the first wireless base station, of one or more of the routes of the set of routes from the first wireless base station to the destination wireless base station is further based on one or more of the following: (i) operation of a Radio Access Technology in licensed versus unlicensed spectrum, (ii) operation of a Radio Access Technology in sub-6 GHz versus mm-wave spectrum, (iii) performance metrics of a Radio Access Technology, (iv) delay budget and reliability requirement of the first flow, (v) number of transitions between Radio Access Technologies required by the route, (vi) number of Backhaul Adaptation Protocol to Backhaul Offload Adaptation Protocol transitions required by the route, and (vii) number of Backhaul Offload Adaptation Protocol to Backhaul Adaptation Protocol transitions required by the route.

7. The wireless communications method of claim 2,
wherein the first wireless base station is a multi-Radio Access Technology device capable of communicating using a first Radio Access Technology and a second Radio Access Technology, said first Radio Access Technology being 5G New Radio radio access technology and said second Radio Access Technology being a non-3GPP Radio Access Technology;
wherein the first wireless base station selects a first route from the set of routes, said first route including a second wireless base station connected to the first wireless base station via a first RAT wireless backhaul link and a second RAT wireless backhaul link; and
wherein said second wireless base station is a multi-Radio Access Technology device capable of communicating using said first Radio Access Technology and said second Radio Access Technology.

8. The wireless communications method of claim 7, further comprising:
determining, by the first wireless base station, a first portion of the data received by the first wireless base station to communicate to the second wireless base station over the second RAT wireless backhaul link;
generating, by the first wireless base station, one or more Backhaul Adaptation Protocol Data Protocol Data Units containing data from the first portion of data received by the first wireless base station; and
generating, by the first wireless base station, one or more Backhaul Offload Adaptation Protocol packets including one or more Backhaul Adaptation Protocol Data Protocol Data Units containing data from the first portion of data received by the first wireless base station.

9. The wireless communications method of claim 8, further comprising:
transmitting from the first wireless base station to the second wireless base station over the second RAT wireless backhaul link the one or more generated Backhaul Offload Adaptation Protocol packets.

10. The wireless communications method of claim 8, further comprising:
determining, by the first wireless base station, a second portion of the data received by the first wireless base station to communicate to the second wireless base station over the first RAT wireless backhaul link;
generating, by the first wireless base station, one or more Backhaul Adaptation Protocol Data Protocol Data Units containing data from the second portion of data received by the first wireless base station; and
transmitting from the first wireless base station to the second wireless base station over the first RAT wireless backhaul link the one or more generated Backhaul Adaptation Protocol Data Protocol Data Units containing the second portion of data received by the first wireless base station.

11. A wireless communications system comprising:
a first wireless base station, said first wireless base station including memory and a first processor, said first processor configured to control the first wireless base station to perform the following operations:
determine a set of routes for the communication of data from the first wireless base station to a destination wireless base station over wireless backhaul communications links, said first wireless base station being an Integrated Access and Backhaul (IAB) donor;
identify each route in the set of routes with a unique path identifier;
receive data of a first flow at the first wireless base station for communication to a first wireless user equipment device attached to the destination wireless base station; and
select, at the first wireless base station, one or more of the routes of the set of routes from the first wireless base station to the destination wireless base station, said selection being based on multi-Radio Access Technology (multi-RAT) capability of wireless base stations of which a route is comprised.

12. The wireless communications system of claim 11, wherein the destination wireless base station and any other wireless base stations in the determined set of routes are Integrated Access and Backhaul (IAB) nodes.

13. The wireless communications system of claim 11, wherein the first processor further controls the first wireless base station to perform the following operations:
select a first route from the set of routes, said first route including a second wireless base station located between the first wireless base station and the destination wireless base station on the selected first route;
transmit, by the first wireless base station, to the second wireless base station the received data of the first flow in Backhaul Offload Adaptation Protocol (BOAP) packets via a Radio Access Technology wireless communications link which is not 5G New Radio.

14. The wireless communications system of claim 13, wherein the first processor further controls the first wireless base station prior to transmitting said Backhaul Offload Adaptation Protocol (BOAP) packets, to perform the following operation:
generate, by the first wireless base station, said Backhaul Offload Adaptation Protocol (BOAP) packets, each generated Backhaul Offload Adaptation Protocol (BOAP) packet encapsulating one or more Backhaul Adaptation Protocol-Protocol Data Units (BAP-PDUs), said Backhaul Adaptation Protocol-PDUs containing said received data and a destination address of the destination wireless base station.

15. The wireless communications system of claim 14, wherein the second wireless base station includes a second processor, said second processor controlling the second wireless base station to perform the following operations:
receive, by the second wireless base station, the transmitted Backhaul Offload Adaptation Protocol (BOAP) packets via the backhaul Radio Access Technology wireless communications link which is not 5G New Radio;
decapsulate, by the second wireless base station, the BAP-PDUs;
extract header information from the decapsulated BAP-PDUs;
determine, by the second wireless base station, whether or not the second wireless base station is the destination for the received BAP-PDUs based on the extracted header information; and
when the second wireless base station determines it is not the destination for the received BAP-PDUs, to select, by the second wireless base station, one or more different wireless backhaul Radio Access Technology communications links to use for transmitting the received BAP-PDUs from the second wireless base station to a next hop in the first route to the destination wireless base station.

16. The wireless communications system of claim 12, wherein said selection, at the first wireless base station, of one or more of the routes of the set of routes from the first wireless base station to the destination wireless base station is further based on one or more of the following: (i) operation of a Radio Access Technology in licensed versus unlicensed spectrum, (ii) operation of a Radio Access Technology in sub-6 GHz versus mm-wave spectrum, (iii) performance metrics of a Radio Access Technology, (iv) delay budget and reliability requirement of the first flow, (v) number of transitions between Radio Access Technologies required by the route, (vi) number of Backhaul Adaptation Protocol to Backhaul Offload Adaptation Protocol transitions required by the route, and (vii) number of Backhaul Offload Adaptation Protocol to Backhaul Adaptation Protocol transitions required by the route.

17. The wireless communications system of claim 12,
wherein the first wireless base station is a multi-Radio Access Technology device capable of communicating using a first Radio Access Technology and a second Radio Access Technology, said first Radio Access Technology being 5G New Radio radio access technology and said second Radio Access Technology being a non-3GPP Radio Access Technology;
wherein the first wireless base station selects a first route from the set of routes, said first route including a second wireless base station connected to the first wireless base station via a first RAT wireless backhaul link and a second RAT wireless backhaul link; and
wherein said second wireless base station is a multi-Radio Access Technology device capable of communicating using said first Radio Access Technology and said second Radio Access Technology.

18. The wireless communications system of claim 17, wherein the first processor further controls the first wireless base station to perform the operations of:
determining, by the first wireless base station, a first portion of the data received by the first wireless base station to communicate to the second wireless base station over the second RAT wireless backhaul link;
generating, by the first wireless base station, one or more Backhaul Adaptation Protocol Data Protocol Data Units containing data from the first portion of data received by the first wireless base station; and
generating, by the first wireless base station, one or more Backhaul Offload Adaptation Protocol packets including one or more Backhaul Adaptation Protocol Data Protocol Data Units containing data from the first portion of data received by the first wireless base station.

19. The wireless communications system of claim 18, wherein the first processor further controls the first wireless base station to perform the operation of:
transmitting from the first wireless base station to the second wireless base station over the second RAT wireless backhaul link the one or more generated Backhaul Offload Adaptation Protocol packets.

20. A non-transitory computer readable medium including a first set of computer executable instructions which when executed by a processor of a first wireless base station, which is an Integrated Access and Backhaul donor, cause the wireless base station to perform the steps of:
determining a set of routes for the communication of data from the first wireless base station to a destination wireless base station over wireless backhaul communications links;
identifying each route in the set of routes with a unique path identifier;
receiving data of a first flow at the first wireless base station for communication to a first wireless user equipment device attached to the destination wireless base station; and
selecting one or more of the routes of the set of routes from the first wireless base station to the destination wireless base station, said selection being based on multi-Radio Access Technology (multi-RAT) capability of wireless base stations of which a route is comprised.

* * * * *